United States Patent [19]

Kimura

[11] Patent Number: 4,666,258

[45] Date of Patent: May 19, 1987

[54] AFOCAL ZOOM LENS SYSTEM

[75] Inventor: Tadashi Kimura, Tokyo, Japan

[73] Assignee: Olympus Optical Co., Ltd., Tokyo, Japan

[21] Appl. No.: 706,865

[22] Filed: Feb. 28, 1985

[30] Foreign Application Priority Data

Mar. 2, 1984 [JP] Japan .................. 59-38651

[51] Int. Cl.$^4$ .................. G02B 9/64; G02B 15/16
[52] U.S. Cl. ........................ 350/427
[58] Field of Search .................. 350/427, 423

[56] References Cited

U.S. PATENT DOCUMENTS 3,679,286  7/1972  Klein .................. 350/427

FOREIGN PATENT DOCUMENTS

| 43-18356 | 8/1968 | Japan . |
| 44-2916 | 2/1969 | Japan . |
| 43-12714 | 5/1969 | Japan . |
| 48-31259 | 9/1973 | Japan . |
| 51-13663 | 5/1976 | Japan . |
| 53-9094 | 4/1978 | Japan . |
| 55-40849 | 10/1980 | Japan . |
| 55-41402 | 10/1980 | Japan . |
| 58-14650 | 3/1983 | Japan . |

*Primary Examiner*—John K. Corbin
*Assistant Examiner*—Rebecca D. Gass
*Attorney, Agent, or Firm*—Cushman, Darby & Cushman

[57] ABSTRACT

An afocal zoom lens system comprising a first lens group having positive refractive power, a second lens group having negative refractive power, a third lens group having positive refractive power, and a fourth lens group having negative refractive power, the zoom lens system as a whole being arranged as an afocal lens system, the afocal zoom lens system being arranged to be zoomed by respectively varying the airspaces between respective lens groups.

19 Claims, 18 Drawing Figures

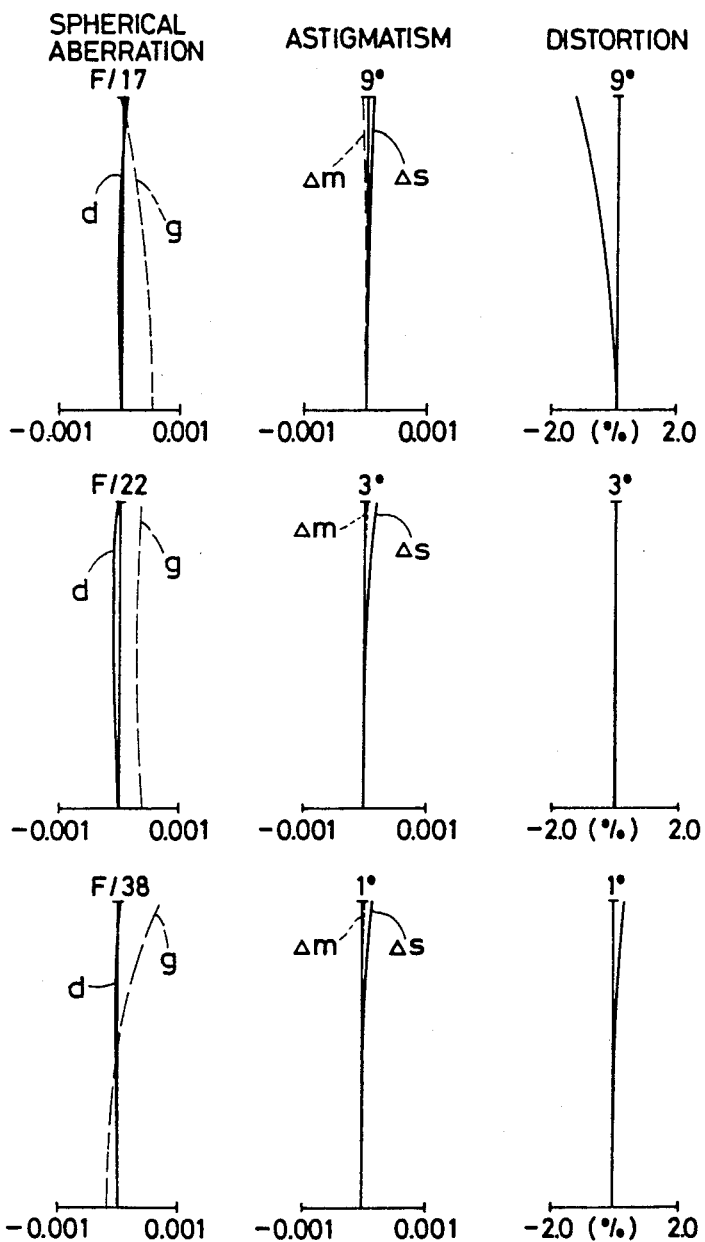

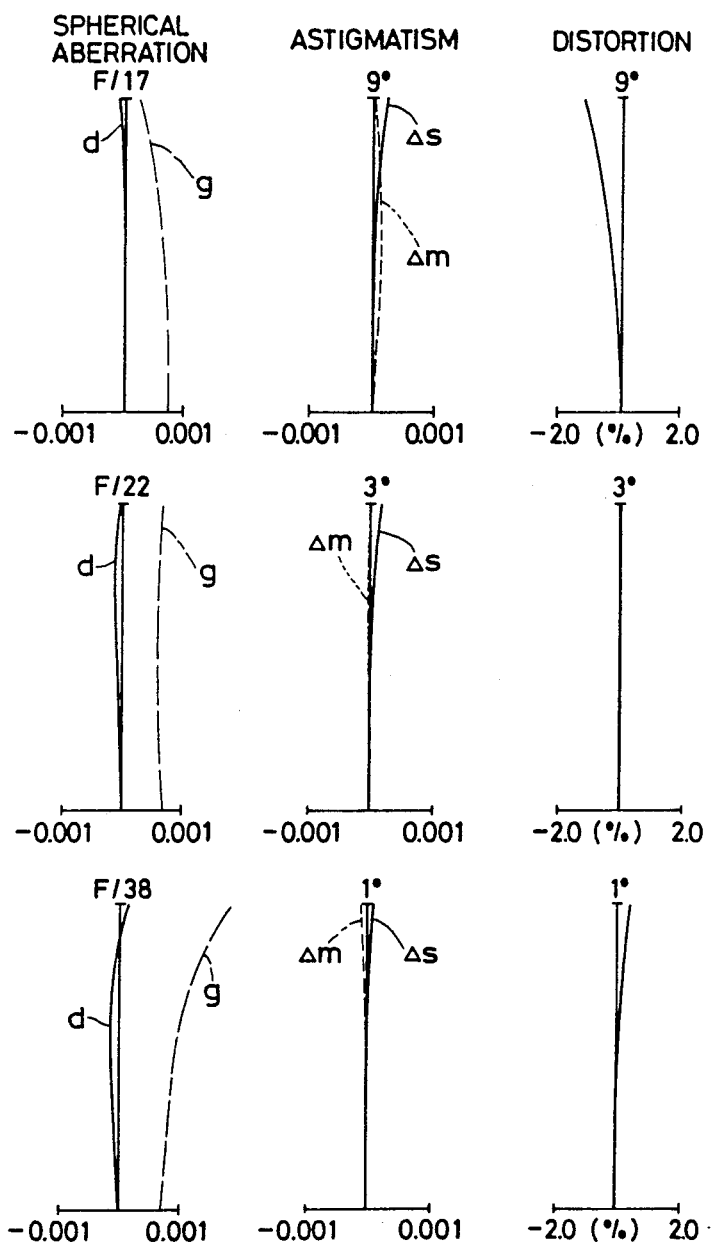

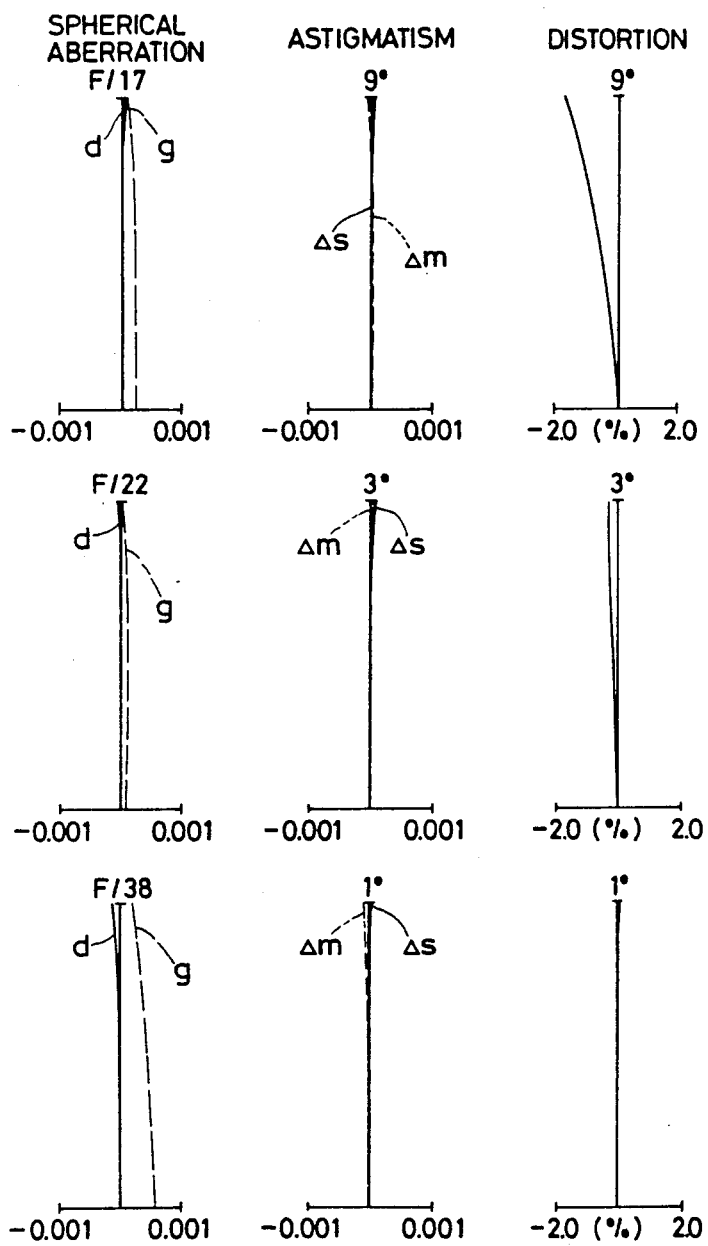

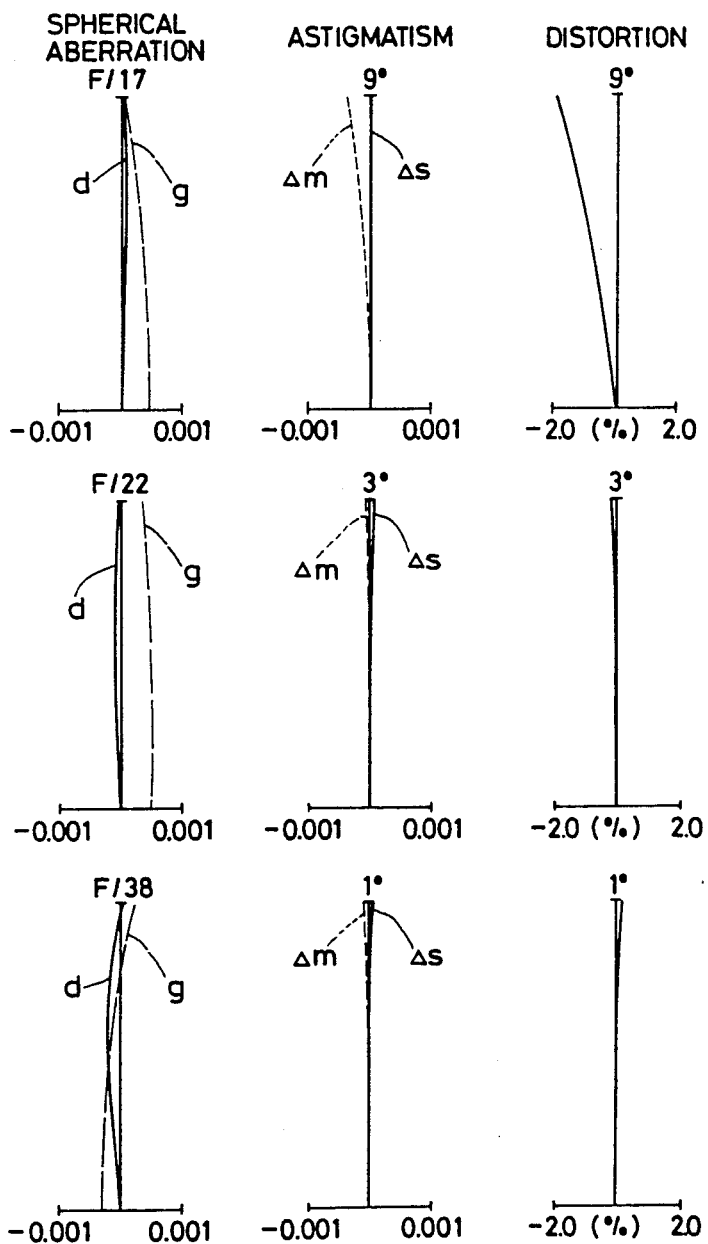

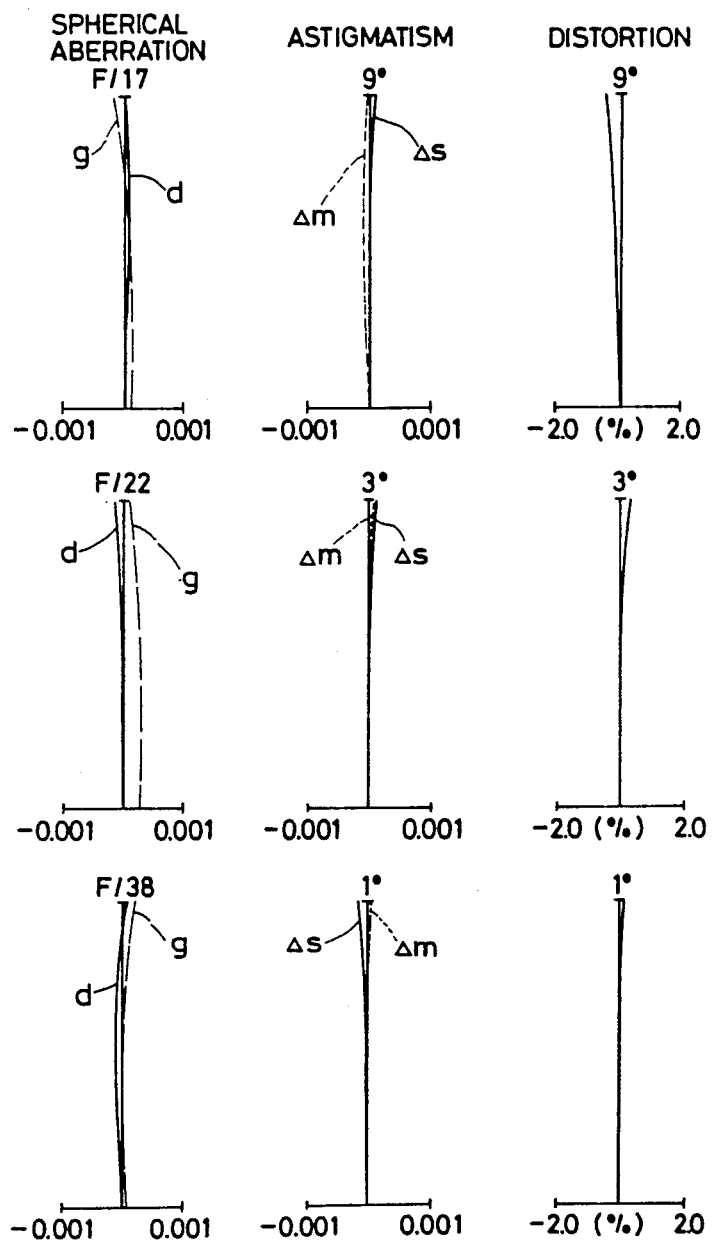

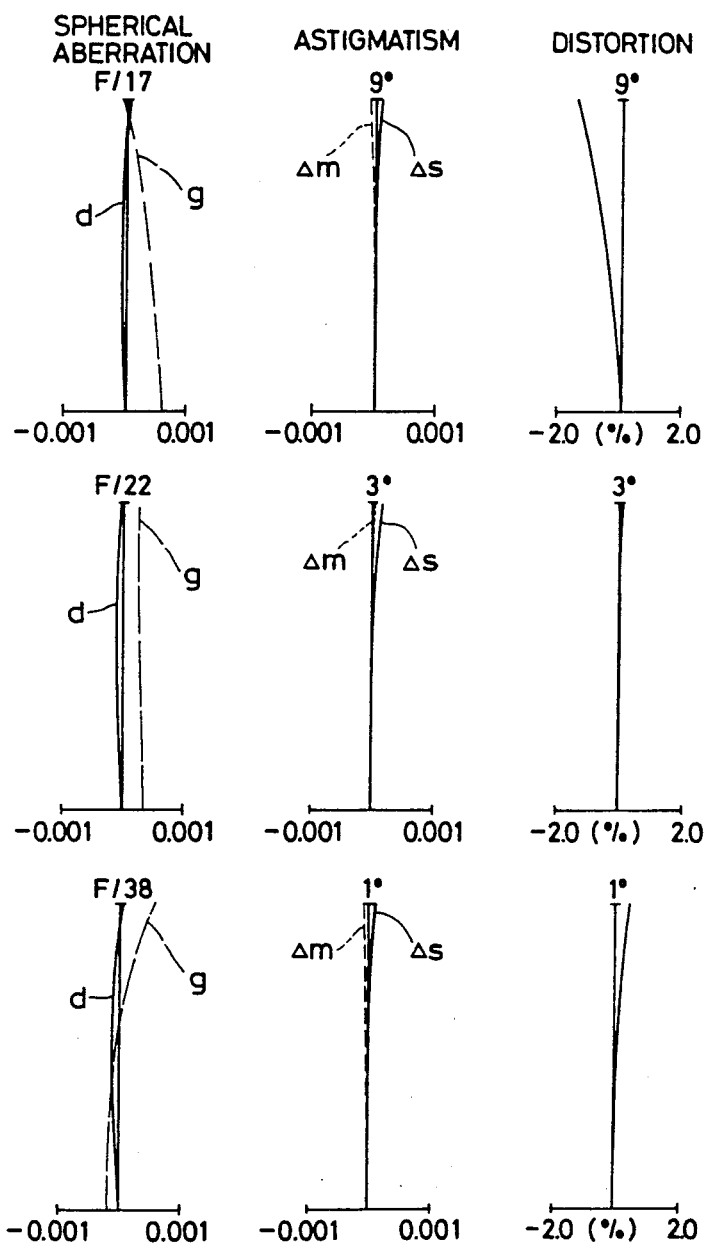

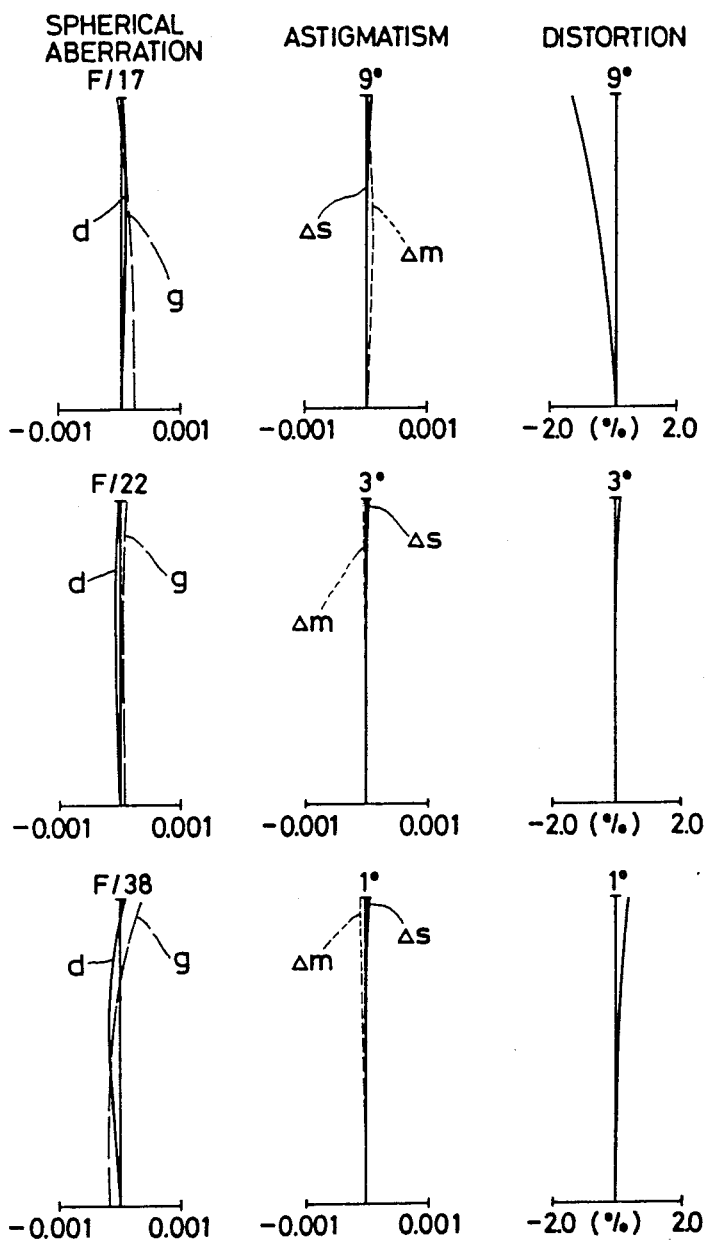

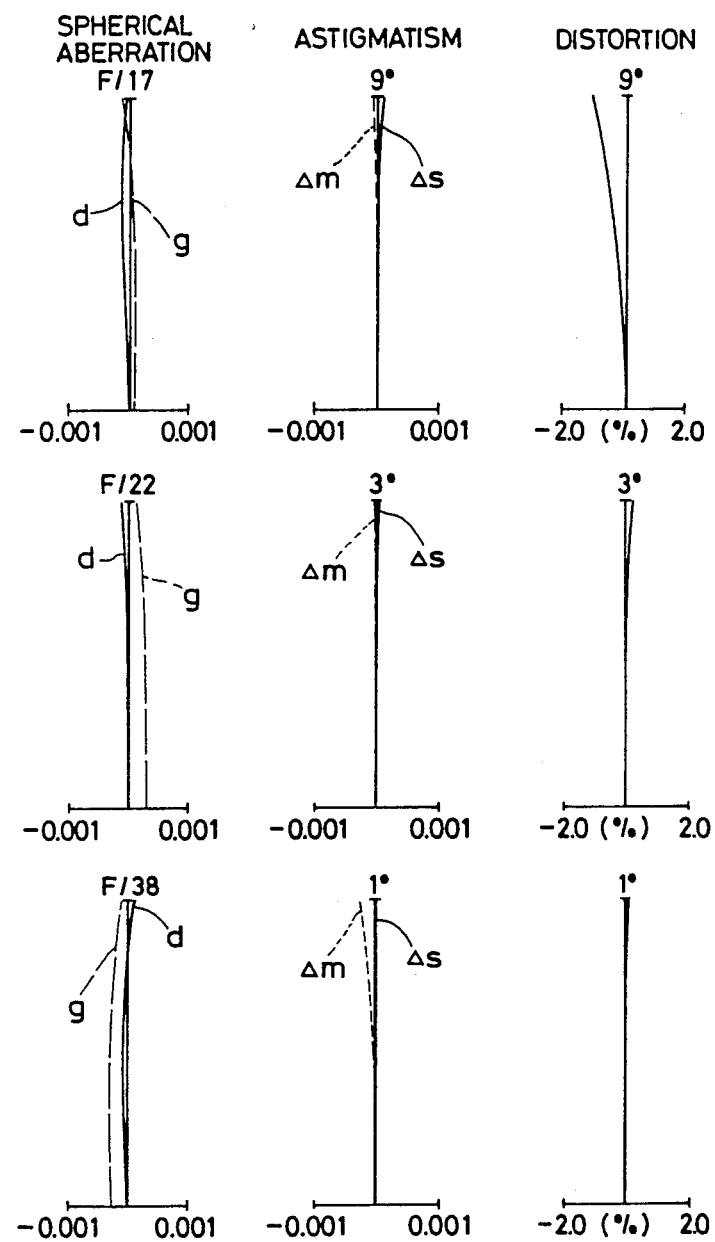

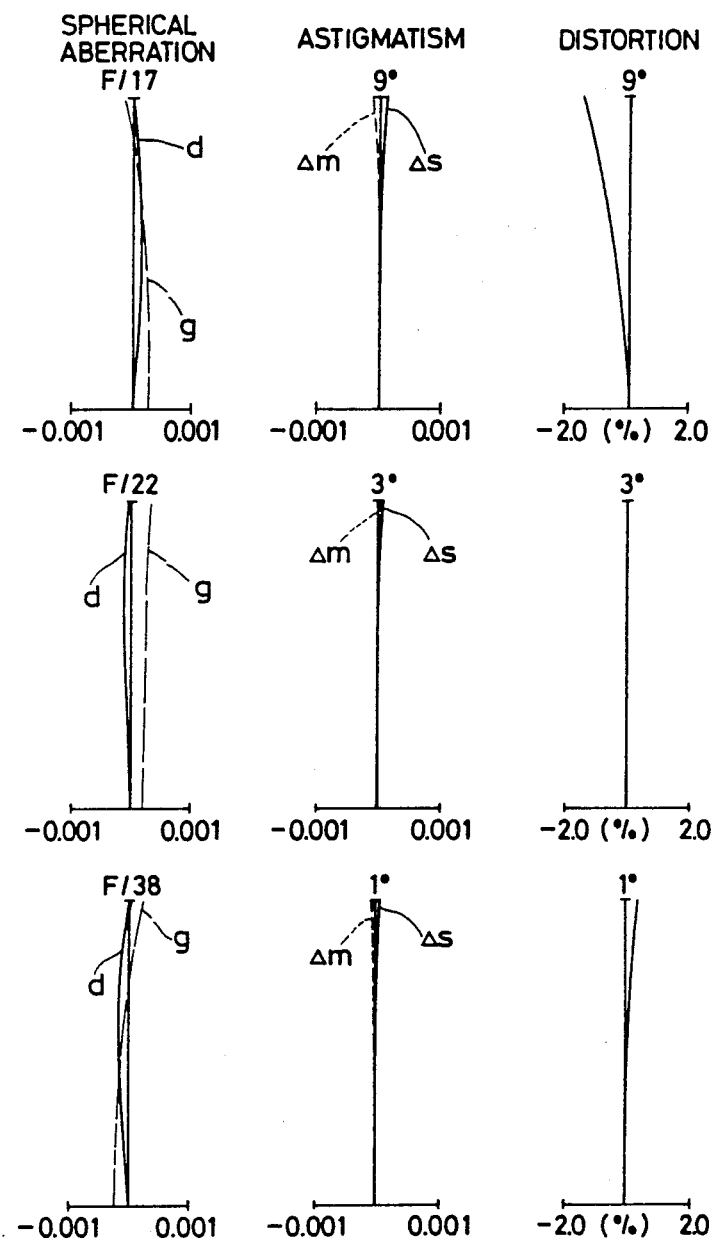

AFOCAL ZOOM LENS SYSTEM

BACKGROUND OF THE INVENTION (a) Field of the Invention

The present invention relates to an afocal zoom lens system and, more particularly, to an afocal zoom lens system to be used with microscopes and the like.

(b) Description of the Prior Art

Many zoom lens systems with comparatively low magnifications to be used with stereomicroscopes, operation microscopes, etc. are known, for example, as disclosed in Japanese published examined patent applications Nos. 31259/73, 2916/69, 18356/68, 12714/68 and so forth. Though the zoom lens systems disclosed in said patent applications have individually different zoom ratios, they are all converging optical systems and, therefore, it is impossible to use them in combination with a photographing device, television device, incident light illumination device provided coaxially with the optical axis of an observation optical system, etc.

Besides, afocal zoom lens systems for photographic cameras are known, for example, as disclosed in Japanese published examined patent applications Nos. 41402/80, 40849/80, 9094/78 and No. 13663/76. However, none of the zoom lens systems desclosed in said patent applications have sufficiently large zoom ratio.

SUMMARY OF THE INVENTION

It is, therefore, a primary object of the present invention to provide an afocal zoom lens system with a large zoom ratio which is capable of being used in combination with a photographing device, television device and so forth.

The afocal zoom lens system according to the present invention comprises, in the order from the object side as shown in FIG. 3, a first lens group comprising at least one positive cemented doublet, which consists of a positive lens element and a negative lens element, and having positive refractive power, a second lens group comprising at least one negative cemented doublet, which consists of a positive lens element and a negative lens element, and having negative refractive power, a third lens group comprising at least one positive cemented doublet, which consists of a negative lens element and a positive lens element, and having positive refractive power, and a fourth lens group comprising at least one negative cemented meniscus doublet, which consists of a negative lens element and a positive lens element, and having negative refractive power, said afocal zoom lens system according to the present invention being arranged to vary the focal length of the lens system as a whole by varying the airspace between the first and second lens groups, the airspace between the second and third lens groups, and the airspace between the third and fourth lens groups respectively, said afocal zoom lens system according to the present invention being further arranged to fulfill the conditions (1) through (7) shown below:

$$-0.35 \times f_I < f_{II} < -0.25 \times f_I \quad (1)$$

$$0.4 \times f_I < f_{III} < 0.6 \times f_I \quad (2)$$

$$-1 \times f_I < f_{IV} < -0.61 \times f_I \quad (3)$$

$$25 < \nu_{1T} - \nu_{1O} \quad (4)$$

$$20 < \nu_{2O} - \nu_{2T} \quad (5)$$

$$35 < \nu_{3T} - \nu_{3O} \quad (6)$$

$$0 < \nu_{4O} - \nu_{4T} \quad (7)$$

where, reference symbols $f_I$, $f_{II}$, $f_{III}$ and $f_{IV}$ respectively represent focal lengths of the first, second, third and fourth lens groups, reference symbols $\nu_{1T}$, $\nu_{2T}$, $\nu_{3T}$ and $\nu_{4T}$ respectively represent mean values of Abbe's numbers of positive lens elements in the first, second, third and fourth lens groups and reference symbols $\nu_{1O}$, $\nu_{2O}$, $\nu_{3O}$ and $\nu_{4O}$ respectively represent mean values of Abbe's numbers of negative lens elements in the first, second, third and fourth lens group.

Out of respective conditions shown in the above, the conditions (1) through (3) respectively define the basic composition of the afocal zoom lens system according to the present invention. By selecting the ratios between the focal lengths of respective lens groups so as to fulfill the conditions (1) through (3), it is possible to obtain a zoom lens system with a large zoom ratio by providing the distances between the principal points of respective lens groups and airspaces betewen respective lens groups so that respective lens groups will not interfere with each other in the maximum focal length position or in the minimum focal length position.

When the value of $f_{II}$ becomes smaller than the lower limit of the condition (1), it is convenient for correction of aberrations. However, the first and second lens groups will interfere with each other in the minimum focal length position. Besides, when it is attempted to prevent interference between the first and second lens groups by maintaining a large zoom ratio, it is unavoidable to shift the zooming range toward the maximum focal length side. In that case, the second lens group will interfere with the third lens group, and this is not desirable. To prevent the second lens group from interfering with the third lens group, it is necessary to make the focal length of the third lens group long. In that case, the amount of movement of the third lens group at the time of zooming becomes large, variation of aberrations in respective states of zooming increases, and this is not preferable. Moreover, the overall length of the lens system becomes long, and the intensity of light in the marginal portion becomes insufficient. When the value of $f_{II}$ becomes larger than the upper limit of the condition (1), the first, second and third lens groups do not interfere with each other, and it is possible to make the zoom ratio still larger. However, aberrations caused by the second lens group becomes large, variation of aberrations at the time of zooming becomes large, and it is impossible to correct aberrations favourably over the range from the minimum focal length position to the maximum focal length position.

If the value of $f_{III}$ becomes smaller than the lower limit of the condition (2), the third lens group will interfere with the second lens group in the maximum focal length position and with the fourth lens group in the minimum focal length position, and it is impossible to make the zoom ratio large. To prevent the above, the absolute values of focal lengths of the second and fourth lens groups should be made small. As a result, aberrations caused by the second lens group become large, and variation of aberrations at the time of zooming become large. Besides, aberrations caused by the fourth lens group also become large, and aberrations become unfavourable in all states of zooming. When the value of $f_{III}$ becomes larger than the upper limit of the condition (2), the third lens group will not tend to interfere with the second lens group or the fourth lens group, and it is possible to make the zoom ratio still larger. However, the amount of movement of the third lens group at the time of zooming becomes large and, consequently, variation of aberrations becomes large. Moreover, the overall length of the lens system becomes long, and the intensity of light in the marginal portion tends to become insufficient.

If the value of $f_{IV}$ becomes smaller than the lower limit of the condition (3), the third lens group tends to interfere with the fourth lens group in the minimum focal length position, and it is impossible to make the zoom ratio large. To prevent the above, it is necessary to make the focal length of the third lens group long. As a result, the amount of movement of the third lens group at the time of zooming becomes large, variation of aberrations becomes large, the overall length of the lens system becomes long, and the intensity of light in the marginal portion tends to become insufficient. When the value of $f_{IV}$ becomes larger that the upper limit of the condition (3), the third and fourth lens groups will not tend to interfere with each other, and it is possible to make the zoom ratio still larger. However, aberrations caused by the fourth lens group become large, and aberrations become unfavourable in all states of zooming.

The conditions (4) through (7) are established in order to correct chromatic aberration favourably over a wide zooming range. By selecting Abbe's numbers of respective lens elements so as to fulfill these conditions, it is possible to obtain an image with favourable contrast which is free from chromatic aberration over a wide range from the maximum focal length position to the minimum focal length position.

If the value of $(\nu_{1T}-\nu_{1O})$ becomes lower than the lower limit of the condition (4), longitudinal chromatic aberration becomes unfavourable especially in the maximum focal length position. When it is attempted to correct said longitudinal chromatic aberration by means of selection of Abbe's numbers of respective lens elements in the other lens group, lateral chromatic aberration in the minimum focal length position becomes unfavourable. When it is attempted to correct said longitudinal chromatic aberration by adjusting the bending of the cemented surface of the cemented doublet in the first lens group, spherical chromatic aberration becomes unfavourable especially in the maximum focal length position though it is possible to correct paraxial chromatic aberration favourably.

If the value of $(\nu_{2O}-\nu_{2T})$ becomes lower than the lower limit of the condition (5), longitudinal chromatic aberration becomes unfavourable in the positions of maximum focal length to medium focal length. When it is attempted to correct said longitudinal chromatic aberration by means of selection of Abbe's numbers of respective lens elements in the other lens groups, lateral chromatic aberration becomes unfavourable in the positions of medium focal length to minimum focal length. When it is attempted to correct said lateral chromatic aberration by adjusting the bendings of respective lens surfaces, the difference between chromatic aberration in the maximum focal length position and chromatic aberration in the minimum focal length position becomes large, and it is difficult to favourably correct chromatic aberration in the maximum focal length position and chromatic aberration in the minimum focal length position at the same time.

If the value of $(\nu_{3T}-\nu_{3O})$ becomes smaller than the lower limit of the condition (6), longitudinal chromatic aberration becomes unfavourable in the positions of maximum focal length to medium focal length. When it is attempted to correct said longitudinal chromatic aberration by means of selection of Abbe's numbers of respective lens elements in the other lens groups, lateral chromatic aberration becomes unfavourable in the positions of medium focal length to minimum focal length. When it is attempted to correct said lateral chromatic aberration by adjusting the bendings of respective lens surfaces, the difference between chromatic aberration in the maximum focal length position and chromatic aberration in the minimum focal length position become large, and it is difficult to favourably correct chromatic aberration in the maximum focal length position and chromatic aberration in the minimum focal length position at the same time.

If the value of $(\nu_{4O}-\nu_{4T})$ becomes lower than the lower limit of the condition (7), chromatic aberration becomes unfavourable in the whole zooming range. When it is attempted to correct said chromatic aberration by adjusting the bendings of respective lens surfaces, chromatic aberration in the maximum focal length position becomes unfavourable, and it is impossible to obtain a favourable image.

By adopting the lens configuration shown in FIG. 3 and arranging to fulfill the conditions (1) through (7) described so far, it is possible to obtain an afocal zoom lens system having favourable performance over a wide range from the minimum focal length position to the maximum focal length position. However, it is possible to obtain a more favourable afocal zoom lens system when it is arranged to further fulfill the conditions (8) through (13) shown below:

$$0.1 < n_{1O} - n_{1T} \tag{8}$$

$$n_T - n_{2O} < 0.25 \tag{9}$$

$$0.2 < n_{3O} - n_{3T} \tag{10}$$

$$-1 < r_{1F}/r_{1R} < -0.3 \tag{11}$$

$$r_{3F}/r_{3R} < 0 \tag{12}$$

$$1 < r_{bR}/r_{4F} < 3 \tag{13}$$

where, reference symbols $n_{1T}$, $n_{2T}$ and $n_{3T}$ respectively represent mean values of refractive indices of positive lens elements constituting the first, second and third lens groups, reference symbols $n_{1O}$, $n_{2O}$ and $n_{3O}$ respectively represent mean values of refractive indices of negative lens elements constituting the first, second and third lens groups, reference symbols $r_{1F}$ and $r_{1R}$ respectively represent radii of curvature of the surface on the object side and surface on the image side of the cemented doublet in the first lens group, reference symbols $r_{3F}$ and $r_{3R}$ respectively represent radii of curvature of the surface on the object side and surface on the image side of the cemented doublet in the third lens group, and reference symbols $r_{4F}$ and $r_{4R}$ respectively represent radii of curvature of the surface on the object side and surface on the image side of the cemented doublet in the fourth lens group.

Out of the conditions (8) through (13) shown in the above, the conditions (8) through (10) are established in order to maintain Petzval's sum favourably and to correct curvature of field favourably over a wide zooming range.

When the value of $(n_{1O} - n_{1T})$ becomes smaller than the lower limit of the condition (8), Petzval's sum becomes a negative value with a large absolute value, and curvature of field becomes unfavourable. When it is attempted to correct it by adjusting the bendings of respective lens surfaces, spherical aberration in the maximum focal length position and spherical chromatic aberration become unfavourable.

When the value of $(n_{2T} - n_{2O})$ becomes larger than the upper limit of the condition (9), Petzval's sum becomes a negative value with a large absolute value, and curvature of field becomes unfavourable. When it is attempted to correct it by adjusting the bendings of respective lens surfaces, spherical aberration and astigmatism become unfavourable in the positions of maximum focal length to medium focal length.

When the value of $(n_{3O} - n_{3T})$ becomes smaller than the lower limit of the condition (10), Petzval's sum becomes a negative value with a large absolute value, and curvature of field becomes unfavourable. When it is attempted to correct it by adjusting the bendings of respective lens surfaces, astigmatism becomes unfavourable in the whole zooming range.

When the value of $r_{1F}/r_{1R}$ becomes smaller than the lower limit of the condition (11), the first and second lens groups will not tend to interfere with each other, and it is possible to obtain a still larger zoom ratio. However, spherical aberration in the maximum focal length position will be aggravated considerably and, when it is attempted to correct said spherical aberration by adjusting the bendings of the other lens surfaces or by some other means, astigmatism and coma become unfavourable in the minimum focal length position. When the value of $r_{1F}/r_{1R}$ becomes larger than the upper limit of the condition (11), the first and second lens groups tend to interfere with each other in the maximum focal length position, and it is difficult to obtain a large zoom ratio.

When the value of $r_{3F}/r_{3R}$ becomes larger than the upper limit of the condition (12), spherical aberration becomes unfavourable in the minimum focal length position. When it is attempted to correct said spherical aberration by adjusting the bendings of the lens elements in the first lens group or second lens group, spherical aberration becomes unfavourable in the maximum focal length position. When it is attempted to correct said spherical aberration in the minimum focal length position by adjusting the bendings of the lens elements in the fourth lens group, spherical aberration becomes unfavourable in the whole zooming range from the minimum focal length position to the maximum focal length position.

When the value of $r_{4R}/r_{4F}$ becomes smaller than the lower limit of the condition (13), spherical aberration becomes unfavourable in the whole zooming range from the minimum focal length position to the maximum focal length position. When it is attempted to correct said spherical aberration by adjusting the bendings of the other lens surfaces, it is impossible to correct spherical aberration in the maximum focal length position favourable. When the value of $r_{4R}/r_{4F}$ becomes larger than the upper limit of the condition (13), spherical aberration will be corrected favourably. However, the third and fourth lens groups tend to interfere with each other in the maximum focal length position, and it is difficult to obtain a wide zooming range. When the focal length of the third lens group is made large in order to prevent the above-mentioned interference, the amount of movement of the third lens group at the time of zooming becomes large, and variation of aberrations becomes large. Moreover, the overall length of the lens system becomes long, and the intensity of light in the marginal position becomes insufficient in the minimum focal length position.

To correct aberrations more favourably, it is preferable to arrange that the afocal zoom lens system according to the present invention further fulfills the conditions (14) through (16) shown below:

$$0.5 < r_{3F}/f_{III} \qquad (14)$$

$$1.54 < n_{2O} \qquad (15)$$

$$1.57 < n_{4O} \qquad (16)$$

where, reference symbol $n_{4O}$ represents the mean value of refractive indices of negative lens elements in the fourth lens group.

The condition (14) is established in order to correct spherical aberration in the minimum focal length position favourably. When the condition (14) is not fulfilled, spherical aberration becomes unfavourable in the minimum focal length position, and it is difficult to correct spherical aberration in a well balanced state over the whole zooming range.

The conditions (15) and (16) are established in order to correct curvature of field favourably in well balanced state over a wide range from the minimum focal length position to the maximum focal length position.

When the value of $n_{2O}$ becomes smaller than the lower limit of the condition (15), Petzval's sum becomes a negative value with a large absolute value, and curvature of field becomes unfavourable. When it is attempted to correct it by adjusting the bendings of respective lens surfaces, spherical aberration and astigmatism become unfavourable in the positions of maximum focal length to medium focal length.

When the value of $n_{4O}$ becomes smaller than the lower limit of the condition (16), Petzval's sum becomes a negative value with a large absolute value, and curvature of field becomes unfavourable. When it is attempted to correct it by adjusting the bendings of respective lens surfaces, spherical aberration becomes unfavourable in the positions of minimum focal length to maximum focal length.

The afocal zoom lens system according to the present invention explained so far is to be used generally by arranging an objective on the object side and an imaging lens system on the image side as described before. Therefore, when used in combination with various kinds of objectives and imaging lens systems having individually different focal lengths, it is possible to use the afocal zoom lens system according to the present invention at various magnifications suitable for the purposes of application. Besides, by coaxially arranging an incident light illumination device between the objective and afocal zoom lens system or between the afocal zoom lens system and imaging lens system or by arranging a photographing device, television device, discussion microscope or the like in combination with the afocal zoom lens system according to the present invention, it is possible to perform various kinds of observation systematically.

FIG. 1 shows the basic composition of an optical system which employs the afocal zoom lens system according to the present invention. In FIG. 1, numeral 1 designates an object, numeral 2 designates an objective, numeral 3 designates the afocal zoom lens system according to the present invention, numeral 4 designates an imaging lens system, and numeral 5 designates the image position.

As shown in FIG. 1, the rays from the object 1, which is placed at the front focal point of the objective 2, become parallel rays passing through the objective 2 and enter the afocal zoom lens system 3. The parallel rays coming out of the afocal zoom lens system 3 form the image 5 at the rear focal point of the imaging lens system 4 by means of the imaging lens system 4. The imaging magnification $\beta_T$ at that time is expressed by the following formula where the magnification of the afocal zoom lens system is represented by reference symbol $\beta_A$, the focal length of the imaging lens system is represented by reference symbol $f_F$, and the focal length of the objective is represented by reference symbol $f_0$.

$$\beta_T = \beta_A \times f_F/f_0$$

As it is evident from the formula shown in the above, it is possible to obtain various imaging magnifications by the same afocal zoom lens system by varying the focal length of the objective and/or the focal length of the imaging lens system. When a long working distance is required, the purpose will be attaihed by using an objective of such type that makes the distance from the objective to its front focal point long, for example, a telephoto type objective, or by using an objective which has a long focal length. In that case, the imaging magnification becomes small, but this problem can be solved by using an imaging lens system which has a long focal length. In that case, the distance from the lens system to the rear focal point becomes long, but this problem can be easily solved by selecting an adequate type of imaging lens system, for example, by using an imaging lens system of telephoto type.

As described in the above, it is possible to use the afocal zoom lens system according to the present invention in various magnification ranges. Besides the above-mentioned various kinds of combinations, the afocal zoom lens system according to the present invention enables to perform various kinds of observation by combining it with various kinds of units as described below.

FIGS. 2A, 2B, 2C and 2D respectively show examples of use of the afocal zoom lens system according to the present invention in combination with several units. In these figures, numeral 1 designates an object, numeral 2 designates an objective, numeral 3 designates the afocal zoom lens system according to the present invention, numeral 4 designates an imaging lens system, numeral 5 designates the image position, and these are substantially the same as those shown in FIG. 1. Numeral 6 designates an eyepiece, numeral 7 designates an eye of an observer, numeral 8 designates a photographing device, numeral 9 a photographic camera, numeral 10 designates an incident light illumination device provided coaxially, numeral 11 designates a lamp, numeral 12 designates a television device, and numeral 13 designates a television camera.

FIG. 2A shows the basic composition of an observation optical system, FIG. 2B shows an optical system when combined with a photographing device, FIG. 2C shows an optical system when combined with an incident light illumination device provided coaxially and a photographic device, and FIG. 2D shows an optical system when combined with an incident light illumination device provided coaxially, a photographing device and a television device.

In any of combinations shown in these figures, the quality of image does not decrease compared with the basic composition shown in FIG. 2A because the rays coming out of the afocal zoom lens system 3 are parallel rays.

BRIEF DESCRIPTION OF THE DRAWINGS

Figs. 5 through 15 respectively show graphs illustrating aberration curves of Embodiments 1 through 11 of the present invention.

DETAILED DESCRIPTION of the PREFERRED EMBODIMENTS

Figure 1:
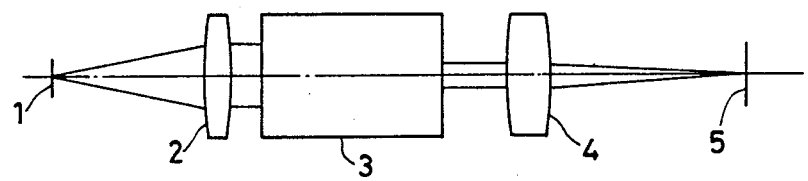
FIG. 1 shows the basic composition of an optical system in which the afocal zoom lens system according to the present invention is used.

Now, preferred embodiments of the afocal zoom lens system according to the present invention are shown below.

| Embodiment 1 | | |
|---|---|---|
| $f = 1 \sim 8.5$ | | |
| $r_1 = 0.6433$ | | |
| $d_1 = 0.040$ | $n_1 = 1.48749$ | $\nu_1 = 70.2$ |
| $r_2 = -0.5318$ | | |
| $d_2 = 0.025$ | $n_2 = 1.71852$ | $\nu_2 = 33.5$ |
| $r_3 = -1.1600$ | | |
| $d_3 = 0.030 \sim 0.493$ | | |
| $r_4 = -1.2264$ | | |
| $d_4 = 0.025$ | $n_3 = 1.78472$ | $\nu_3 = 25.7$ |
| $r_5 = -0.3422$ | | |
| $d_5 = 0.019$ | $n_4 = 1.48749$ | $\nu_4 = 70.2$ |
| $r_6 = 0.5427$ | | |
| $d_6 = 0.031$ | | |
| $r_7 = -0.3931$ | | |
| $d_7 = 0.019$ | $n_5 = 1.6228$ | $\nu_5 = 57.1$ |
| $r_8 = 0.6539$ | | |
| $d_8 = 1.014 \sim 0.099$ | | |
| $r_9 = 0.4629$ | | |
| $d_9 = 0.020$ | $n_6 = 1.74$ | $\nu_6 = 28.3$ |
| $r_{10} = 0.2683$ | | |
| $d_{10} = 0.041$ | $n_7 = 1.4645$ | $\nu_7 = 65.9$ |
| $r_{11} = -0.5143$ | | |
| $d_{11} = 0.002$ | | |
| $r_{12} = 0.6598$ | | |
| $d_{12} = 0.020$ | $n_8 = 1.48749$ | $\nu_8 = 70.2$ |
| $r_{13} = 1.5338$ | | |
| $d_{13} = 0.093 \sim 0.544$ | | |
| $r_{14} = 3.2732$ | | |
| $d_{14} = 0.020$ | $n_9 = 1.78472$ | $\nu_9 = 25.7$ |
| $r_{15} = 0.5110$ | | |
| $d_{15} = 0.045$ | | |
| $r_{16} = -0.2105$ | | |
| $d_{16} = 0.020$ | $n_{10} = 1.58904$ | $\nu_{10} = 53.2$ |
| $r_{17} = 0.2374$ | | |
| $d_{17} = 0.053$ | $n_{11} = 1.60342$ | $\nu_{11} = 38.0$ |
| $r_{18} = -0.2624$ | | |

Embodiment 1 -continued $f_{II} = -0.284 \times f_I$, $f_{III} = 0.499 \times f_I$
$f_{IV} = -0.714 \times f_I$, $\nu_{1T} - \nu_{1O} = 36.7$
$\nu_{2O} - \nu_{2T} = 37.9$, $\nu_{3T} - \nu_{3O} = 39.8$
$\nu_{4O} - \nu_{4T} = 13.8$, $n_{1O} - n_{1T} = 0.23103$
$n_{2T} - n_{2O} = 0.22957$, $n_{3O} - n_{3T} = 0.264$
$r_{1F}/r_{1R} = -0.555$, $r_{3F}/r_{3R} = -0.900$
$r_{4R}/r_{4F} = 1.247$, $r_{3F}/f_{III} = 0.869$
$n_{2O} = 1.55515$, $n_{4O} = 1.68688$

Embodiment 2

$f = 1 \sim 8.5$
$r_1 = 0.7084$
$d_1 = 0.041$     $n_1 = 1.48749$     $\nu_1 = 70.2$
$r_2 = -0.4971$
$d_2 = 0.027$     $n_2 = 1.68893$     $\nu_2 = 31.1$
$r_3 = -1.0800$
$d_3 = 0.027 \sim 0.503$
$r_4 = -1.2765$
$d_4 = 0.027$     $n_3 = 1.78472$     $\nu_3 = 25.7$
$r_5 = -0.3023$
$d_5 = 0.019$     $n_4 = 1.48749$     $\nu_4 = 70.2$
$r_6 = 0.6301$
$d_6 = 0.029$
$r_7 = -0.3473$
$d_7 = 0.019$     $n_5 = 1.62280$     $\nu_5 = 57.1$
$r_8 = 0.6646$
$d_8 = 1.046 \sim 0.104$
$r_9 = 0.5261$
$d_9 = 0.020$     $n_6 = 1.69895$     $\nu_6 = 30.1$
$r_{10} = 0.2696$
$d_{10} = 0.042$     $n_7 = 1.48749$     $\nu_7 = 70.2$
$r_{11} = -0.5369$
$d_{11} = 0.002$
$r_{12} = 0.4993$
$d_{12} = 0.020$     $n_8 = 1.48749$     $\nu_8 = 70.2$
$r_{13} = 0.8153$
$d_{13} = 0.086 \sim 0.553$
$r_{14} = 1.0709$
$d_{14} = 0.020$     $n_9 = 1.76182$     $\nu_9 = 26.5$
$r_{15} = 0.3729$
$d_{15} = 0.046$
$r_{16} = -0.2144$
$d_{16} = 0.020$     $n_{10} = 1.57135$     $\nu_{10} = 52.9$
$r_{17} = 0.2915$
$d_{17} = 0.048$     $n_{11} = 1.61659$     $\nu_{11} = 36.6$
$r_{18} = -0.2814$
$f_{II} = -0.286 \times f_I$, $f_{III} = 0.502 \times f_I$
$f_{IV} = -0.718 \times f_I$, $\nu_{1T} - \nu_{1O} = 39.1$
$\nu_{2O} - \nu_{2T} = 37.9$, $\nu_{3T} - \nu_{3O} = 40.0$
$\nu_{4O} - \nu_{4T} = 3.09$, $n_{1O} - n_{1T} = 0.20144$
$n_{2T} - n_{2O} = 0.22957$, $n_{3O} - n_{3T} = 0.21146$
$r_{1F}/r_{1R} = -0.656$, $r_{3F}/r_{3R} = -0.980$
$r_{4R}/r_{4F} = 1.312$, $r_{3F}/f_{III} = 0.958$
$n_{2O} = 1.55515$, $n_{4O} = 1.66659$

Embodiment 3

$f = 1 \sim 8.5$
$r_1 = 0.6961$
$d_1 = 0.036$     $n_1 = 1.48749$     $\nu_1 = 70.2$
$r_2 = -0.6168$
$d_2 = 0.020$     $n_2 = 1.68893$     $\nu_2 = 31.1$
$r_3 = -1.4581$
$d_3 = 0.032 \sim 0.553$
$r_4 = -0.6233$
$d_4 = 0.027$     $n_3 = 1.68893$     $\nu_3 = 31.1$
$r_5 = -0.1986$
$d_5 = 0.015$     $n_4 = 1.617$     $\nu_4 = 62.8$
$r_6 = 1.3167$
$d_6 = 0.020$
$r_7 = -1.0605$
$d_7 = 0.013$     $n_5 = 1.618$     $\nu_5 = 63.4$
$r_8 = 0.7140$
$d_8 = 1.099 \sim 0.026$
$r_9 = 0.9852$

Embodiment 3 -continued $d_9 = 0.022$     $n_6 = 1.72151$     $\nu_6 = 29.2$
$r_{10} = 0.4857$
$d_{10} = 0.042$     $n_7 = 1.497$     $\nu_7 = 81.6$
$r_{11} = -0.6691$
$d_{11} = 0.003$
$r_{12} = 0.9359$
$d_{12} = 0.038$     $n_8 = 1.497$     $\nu_8 = 81.6$
$r_{13} = -6.6689$
$d_{13} = 0.110 \sim 0.663$
$r_{14} = -1.7152$
$d_{14} = 0.015$     $n_9 = 1.6968$     $\nu_9 = 55.5$
$r_{15} = 0.9348$
$d_{15} = 0.023$
$r_{16} = -0.3374$
$d_{16} = 0.017$     $n_{10} = 1.48749$     $\nu_{10} = 70.2$
$r_{17} = 0.4072$
$d_{17} = 0.050$     $n_{11} = 1.5927$     $\nu_{11} = 35.3$
$r_{18} = -0.5438$
$f_{II} = -0.306 \times f_I$, $f_{III} = -0.528 \times f_I$
$f_{IV} = -0.743 \times f_I$, $\nu_{1T} - \nu_{1O} = 39.1$
$\nu_{2O} - \nu_{2T} = 32.0$, $\nu_{3T} - \nu_{3O} = 52.4$
$\nu_{4O} - \nu_{4T} = 27.55$, $n_{1O} - n_{1T} = 0.20144$
$n_{2T} - n_{2O} = 0.07143$, $n_{3O} - n_{3T} = 0.22451$
$r_{1F}/r_{1R} = -0.477$, $r_{3F}/r_{3R} = -1.472$
$r_{4R}/r_{4F} = 1.612$, $r_{3F}/f_{III} = 1.572$
$n_{2O} = 1.6175$, $n_{4O} = 1.59215$

Embodiment 4

$f = 1 \sim 8.5$
$r_1 = 0.4890$
$d_1 = 0.044$     $n_1 = 1.48749$     $\nu_1 = 70.2$
$r_2 = -0.5133$
$d_2 = 0.025$     $n_2 = 1.74$     $\nu_2 = 31.7$
$r_3 = -1.2298$
$d_3 = 0.028 \sim 0.415$
$r_4 = -1.7147$
$d_4 = 0.026$     $n_3 = 1.78472$     $\nu_3 = 25.7$
$r_5 = -0.2409$
$d_5 = 0.019$     $n_4 = 1.72916$     $\nu_4 = 54.7$
$r_6 = 0.6446$
$d_6 = 0.02$
$r_7 = -0.6745$
$d_7 = 0.019$     $n_5 = 1.6968$     $\nu_5 = 56.5$
$r_8 = 0.5799$
$d_8 = 0.899 \sim 0.067$
$r_9 = 30.6851$
$d_9 = 0.02$     $n_6 = 1.78472$     $\nu_6 = 25.7$
$r_{10} = 0.8484$
$d_{10} = 0.029$     $n_7 = 1.497$     $\nu_7 = 81.6$
$r_{11} = -0.4200$
$d_{11} = 0.001$
$r_{12} = 0.6021$
$d_{12} = 0.026$     $n_8 = 1.497$     $\nu_8 = 81.6$
$r_{13} = -1.9742$
$d_{13} = 0.058 \sim 0.503$
$r_{14} = 1.0666$
$d_{14} = 0.02$     $n_9 = 1.8044$     $\nu_9 = 39.6$
$r_{15} = 0.4589$
$d_{15} = 0.042$
$r_{16} = -0.2689$
$d_{16} = 0.02$     $n_{10} = 1.51118$     $\nu_{10} = 51.0$
$r_{17} = 0.3069$
$d_{17} = 0.042$     $n_{11} = 1.5927$     $\nu_{11} = 35.3$
$r_{18} = -0.5009$
$f_{II} = -0.296 \times f_I$, $f_{III} = 0.563 \times f_I$
$f_{IV} = -0.838 \times f_I$, $\nu_{1T} - \nu_{1O} = 38.5$
$\nu_{2O} - \nu_{2T} = 29.9$, $\nu_{3T} - \nu_{3O} = 55.9$
$\nu_{4O} - \nu_{4T} = 10.01$, $n_{1O} - n_{1T} = 0.25251$
$n_{2T} - n_{2O} = 0.07174$, $n_{3O} - n_{3T} = 0.28772$
$r_{1F}/r_{1R} = -0.398$, $r_{3F}/r_{3R} = -73.068$
$r_{4R}/r_{4F} = 1.863$, $r_{3F}/f_{III} = 59.867$
$n_{2O} = 1.71298$, $n_{4O} = 1.65779$

| Embodiment 5 | | | |
|---|---|---|---|
| $f = 1 \sim 8.5$ | | | |
| $r_1 = 0.9250$ | | | |
| $d_1 = 0.037$ | | $n_1 = 1.48749$ | $\nu_1 = 70.2$ |
| $r_2 = -0.4910$ | | | |
| $d_2 = 0.025$ | | $n_2 = 1.66446$ | $\nu_2 = 35.7$ |
| $r_3 = -1.0438$ | | | |
| $d_3 = 0.039 \sim 0.594$ | | | |
| $r_4 = -1.1582$ | | | |
| $d_4 = 0.028$ | | $n_3 = 1.69895$ | $\nu_3 = 30.1$ |
| $r_5 = -0.2321$ | | | |
| $d_5 = 0.016$ | | $n_4 = 1.6425$ | $\nu_4 = 58.4$ |
| $r_6 = 0.9213$ | | | |
| $d_6 = 0.019$ | | | |
| $r_7 = -0.6726$ | | | |
| $d_7 = 0.016$ | | $n_5 = 1.6425$ | $\nu_5 = 58.4$ |
| $r_8 = 1.1459$ | | | |
| $d_8 = 1.197 \sim 0.070$ | | | |
| $r_9 = 0.8980$ | | | |
| $d_9 = 0.022$ | | $n_6 = 1.72825$ | $\nu_6 = 28.5$ |
| $r_{10} = 0.4415$ | | | |
| $d_{10} = 0.037$ | | $n_7 = 1.497$ | $\nu_7 = 81.6$ |
| $r_{11} = -0.6773$ | | | |
| $d_{11} = 0.003$ | | | |
| $r_{12} = 0.8232$ | | | |
| $d_{12} = 0.033$ | | $n_8 = 1.497$ | $\nu_8 = 81.6$ |
| $r_{13} = 4.7356$ | | | |
| $d_{13} = 0.049 \sim 0.622$ | | | |
| $r_{14} = 2.2417$ | | | |
| $d_{14} = 0.021$ | | $n_9 = 1.74$ | $\nu_9 = 31.7$ |
| $r_{15} = 0.6773$ | | | |
| $d_{15} = 0.029$ | | | |
| $r_{16} = -0.3326$ | | | |
| $d_{16} = 0.021$ | | $n_{10} = 1.50847$ | $\nu_{10} = 60.8$ |
| $r_{17} = 0.3326$ | | | |
| $d_{17} = 0.040$ | | $n_{11} = 1.5927$ | $\nu_{11} = 35.3$ |
| $r_{18} = -0.6358$ | | | |
| $f_{II} = -0.302 \times f_I$, $f_{III} = 0.530 \times f_I$ | | | |
| $f_{IV} = -0.781 \times f_I$, $\nu_{1T} - \nu_{1O} = 34.4$ | | | |
| $\nu_{2O} - \nu_{2T} = 28.3$, $\nu_{3T} - \nu_{3O} = 53.2$ | | | |
| $\nu_{4O} - \nu_{4T} = 11.0$, $n_{1O} - n_{1T} = 0.17697$ | | | |
| $n_{2T} - n_{2O} = 0.05645$, $n_{3O} - n_{3T} = 0.23125$ | | | |
| $r_{1F}/r_{1R} = -0.886$, $r_{3F}/r_{3R} = -1.326$ | | | |
| $r_{4R}/r_{4F} = 1.912$, $r_{3F}/f_{III} = 1.352$ | | | |
| $n_{2O} = 1.6425$, $n_{4O} = 1.62424$ | | | |

| Embodiment 6 | | | |
|---|---|---|---|
| $f = 1 \sim 8.5$ | | | |
| $r_1 = 0.6785$ | | | |
| $d_1 = 0.041$ | | $n_1 = 1.497$ | $\nu_1 = 81.6$ |
| $r_2 = -0.4757$ | | | |
| $d_2 = 0.025$ | | $n_2 = 1.6445$ | $\nu_2 = 40.8$ |
| $r_3 = -1.2253$ | | | |
| $d_3 = 0.042 \sim 0.503$ | | | |
| $r_4 = -0.8372$ | | | |
| $d_4 = 0.025$ | | $n_3 = 1.78472$ | $\nu_3 = 25.7$ |
| $r_5 = -0.2964$ | | | |
| $d_5 = 0.019$ | | $n_4 = 1.48749$ | $\nu_4 = 70.2$ |
| $r_6 = 0.6364$ | | | |
| $d_6 = 0.015$ | | | |
| $r_7 = -0.4158$ | | | |
| $d_7 = 0.019$ | | $n_5 = 1.6228$ | $\nu_5 = 57.1$ |
| $r_8 = 0.6018$ | | | |
| $d_8 = 1.010 \sim 0.100$ | | | |
| $r_9 = 0.4625$ | | | |
| $d_9 = 0.020$ | | $n_6 = 1.74$ | $\nu_6 = 28.3$ |
| $r_{10} = 0.2689$ | | | |
| $d_{10} = 0.041$ | | $n_7 = 1.4645$ | $\nu_7 = 65.9$ |
| $r_{11} = -0.5255$ | | | |
| $d_{11} = 0.002$ | | | |
| $r_{12} = 0.6642$ | | | |
| $d_{12} = 0.020$ | | $n_8 = 1.48749$ | $\nu_8 = 70.2$ |
| $r_{13} = 1.7010$ | | | |
| $d_{13} = 0.103 \sim 0.553$ | | | |
| $r_{14} = 3.0806$ | | | |
| $d_{14} = 0.02$ | | $n_9 = 1.78472$ | $\nu_9 = 25.7$ |
| $r_{15} = 0.4844$ | | | |
| $d_{15} = 0.031$ | | | |

| —continued | | | |
|---|---|---|---|
| Embodiment 6 | | | |
| $r_{16} = -0.1911$ | | | |
| $d_{16} = 0.02$ | | $n_{10} = 1.58904$ | $\nu_{10} = 53.2$ |
| $r_{17} = 0.2760$ | | | |
| $d_{17} = 0.053$ | | $n_{11} = 1.60342$ | $\nu_{11} = 38.0$ |
| $r_{18} = -0.2357$ | | | |
| $f_{II} = -0.284 \times f_I$, $f_{III} = 0.499 \times f_I$ | | | |
| $f_{IV} = -0.714 \times f_I$, $\nu_{1T} - \nu_{1O} = 40.81$ | | | |
| $\nu_{2O} - \nu_{2T} = 37.9$, $\nu_{3T} - \nu_{3O} = 39.8$ | | | |
| $\nu_{4O} - \nu_{4T} = 1.4$, $n_{1O} - n_{1T} = 0.1475$ | | | |
| $n_{2T} - n_{2O} = 0.22957$, $n_{3O} - n_{3T} = 0.264$ | | | |
| $r_{1F}/r_{1R} = -0.554$, $r_{3F}/r_{3R} = -0.880$ | | | |
| $r_{4R}/r_{4F} = 1.233$, $r_{3F}/f_{III} = 0.872$ | | | |
| $n_{2O} = 1.55515$, $n_{4O} = 1.68688$ | | | |

| Embodiment 7 | | | |
|---|---|---|---|
| $f = 1 \sim 8.5$ | | | |
| $r_1 = 0.7291$ | | | |
| $d_1 = 0.041$ | | $n_1 = 1.497$ | $\nu_1 = 81.61$ |
| $r_2 = -0.4838$ | | | |
| $d_2 = 0.025$ | | $n_2 = 1.6445$ | $\nu_2 = 40.8$ |
| $r_3 = -1.2162$ | | | |
| $d_3 = 0.047 \sim 0.519$ | | | |
| $r_4 = -1.9285$ | | | |
| $d_4 = 0.028$ | | $n_3 = 1.7552$ | $\nu_3 = 27.51$ |
| $r_5 = -0.2816$ | | | |
| $d_5 = 0.019$ | | $n_4 = 1.641$ | $\nu_4 = 56.93$ |
| $r_6 = 0.7541$ | | | |
| $d_6 = 0.012$ | | | |
| $r_7 = -0.5231$ | | | |
| $d_7 = 0.019$ | | $n_5 = 1.63854$ | $\nu_5 = 55.38$ |
| $r_8 = 0.7167$ | | | |
| $d_8 = 1.085 \sim 0.076$ | | | |
| $r_9 = 0.7201$ | | | |
| $d_9 = 0.019$ | | $n_6 = 1.80518$ | $\nu_6 = 25.43$ |
| $r_{10} = 0.3647$ | | | |
| $d_{10} = 0.036$ | | $n_7 = 1.50137$ | $\nu_7 = 56.4$ |
| $r_{11} = -0.5370$ | | | |
| $d_{11} = 0.002$ | | | |
| $r_{12} = 0.4519$ | | | |
| $d_{12} = 0.027$ | | $n_8 = 1.497$ | $\nu_8 = 81.61$ |
| $r_{13} = 0.7508$ | | | |
| $d_{13} = 0.042 \sim 0.579$ | | | |
| $r_{14} = 1.2694$ | | | |
| $d_{14} = 0.019$ | | $n_9 = 1.7552$ | $\nu_9 = 27.51$ |
| $r_{15} = 0.4692$ | | | |
| $d_{15} = 0.023$ | | | |
| $r_{16} = -0.2983$ | | | |
| $d_{16} = 0.019$ | | $n_{10} = 1.57957$ | $\nu_{10} = 53.71$ |
| $r_{17} = 0.2983$ | | | |
| $d_{17} = 0.044$ | | $n_{11} = 1.61659$ | $\nu_{11} = 36.63$ |
| $r_{18} = -0.3977$ | | | |
| $f_{II} = -0.299 \times f_I$, $f_{III} = 0.540 \times f_I$ | | | |
| $f_{IV} = -0.821 \times f_I$, $\nu_{1T} - \nu_{1O} = 40.81$ | | | |
| $\nu_{2O} - \nu_{2T} = 28.65$, $\nu_{3T} - \nu_{3O} = 43.58$ | | | |
| $\nu_{4O} - \nu_{4T} = 3.98$, $n_{1O} - n_{1T} = 0.1475$ | | | |
| $n_{2T} - n_{2O} = 0.11543$, $n_{3O} - n_{3T} = 0.30599$ | | | |
| $r_{1F}/r_{1R} = -0.05553$, $r_{3F}/r_{3R} = -2.557$ | | | |
| $r_{4R}/r_{4F} = 1.333$, $r_{3F}/f_{III} = 1.2$ | | | |
| $n_{2O} = 1.63977$, $n_{4O} = 1.67212$ | | | |

| Embodiment 8 | | | |
|---|---|---|---|
| $f = 1 \sim 8.5$ | | | |
| $r_1 = 0.9057$ | | | |
| $d_1 = 0.036$ | | $n_1 = 1.497$ | $\nu_1 = 81.61$ |
| $r_2 = -0.4744$ | | | |
| $d_2 = 0.024$ | | $n_2 = 1.66755$ | $\nu_2 = 41.93$ |
| $r_3 = -1.0323$ | | | |
| $d_3 = 0.038 \sim 0.571$ | | | |
| $r_4 = -1.1039$ | | | |
| $d_4 = 0.027$ | | $n_3 = 1.69895$ | $\nu_3 = 30.12$ |
| $r_5 = -0.2230$ | | | |
| $d_5 = 0.015$ | | $n_4 = 1.6425$ | $\beta_4 = 58.37$ |
| $r_6 = 0.9072$ | | | |
| $d_6 = 0.018$ | | | |

Embodiment 8 -continued

| | | |
|---|---|---|
| $r_7 = -0.6354$ | | |
| $d_7 = 0.015$ | $n_5 = 1.6425$ | $\nu_5 = 58.37$ |
| $r_8 = 1.1111$ | | |
| $d_8 = 1.1473 \sim 0.067$ | | |
| $r_9 = 0.8719$ | | |
| $d_9 = 0.022$ | $n_6 = 1.72825$ | $\nu_6 = 28.46$ |
| $r_{10} = 0.4221$ | | |
| $d_{10} = 0.036$ | $n_7 = 1.497$ | $\nu_7 = 81.61$ |
| $r_{11} = -0.6249$ | | |
| $d_{11} = 0.003$ | | |
| $r_{12} = 0.7691$ | | |
| $d_{12} = 0.032$ | $n_8 = 1.497$ | $\nu_8 = 81.61$ |
| $r_{13} = 3.3266$ | | |
| $d_{13} = 0.035 \sim 0.582$ | | |
| $r_{14} = 2.2185$ | | |
| $d_{14} = 0.020$ | $n_9 = 1.74$ | $\nu_9 = 31.7$ |
| $r_{15} = 0.7277$ | | |
| $d_{15} = 0.028$ | | |
| $r_{16} = -0.3759$ | | |
| $d_{16} = 0.020$ | $n_{10} = 1.50847$ | $\nu_{10} = 60.83$ |
| $r_{17} = 0.3198$ | | |
| $d_{17} = 0.038$ | $n_{11} = 1.5927$ | $\nu_{11} = 35.29$ |
| $r_{18} = -0.8989$ | | |

$f_{II} = -0.302 \times f_I$, $f_{III} = 0.53 \times f_I$
$f_{IV} = -0.782 \times f_I$, $\nu_{1T} - \nu_{1O} = 39.68$
$\nu_{2O} - \nu_{2T} = 28.25$, $\nu_{3T} - \nu_{3O} = 53.15$
$\nu_{4O} - \nu_{4T} = 11.01$, $n_{1O} - n_{1T} = 0.17155$
$n_{2T} - n_{2O} = 0.05645$, $n_{3O} - n_{3T} = 0.23125$
$r_{1F}/r_{1R} = -0.877$, $r_{3F}/r_{3R} = -1.395$
$r_{4R}/r_{4F} = 2.392$, $r_{3F}/f_{III} = 1.366$
$n_{2O} = 1.6425$, $n_{4O} = 1.62424$

Embodiment 8

| | | |
|---|---|---|
| $f = 1 \sim 8.5$ | | |
| $r_1 = 0.6822$ | | |
| $d_1 = 0.038$ | $n_1 = 1.497$ | $\nu_1 = 81.61$ |
| $r_2 = -0.5269$ | | |
| $d_2 = 0.024$ | $n_2 = 1.6445$ | $\nu_2 = 40.8$ |
| $r_3 = -1.4201$ | | |
| $d_3 = 0.027 \sim 0.517$ | | |
| $r_4 = -1.4065$ | | |
| $d_4 = 0.025$ | $n_3 = 1.7552$ | $\nu_3 = 27.51$ |
| $r_5 = -0.2768$ | | |
| $d_5 = 0.019$ | $n_4 = 1.641$ | $\nu_4 = 56.93$ |
| $r_6 = 0.9065$ | | |
| $d_6 = 0.017$ | | |
| $r_7 = -0.5489$ | | |
| $d_7 = 0.019$ | $n_5 = 1.63854$ | $\nu_5 = 55.38$ |
| $r_8 = 0.7053$ | | |
| $d_8 = 1.088 \sim 0.078$ | | |
| $r_9 = 0.5977$ | | |
| $d_9 = 0.019$ | $n_6 = 1.78472$ | $\nu_6 = 25.68$ |
| $r_{10} = 0.3187$ | | |
| $d_{10} = 0.036$ | $n_7 = 1.50137$ | $\nu_7 = 56.4$ |
| $r_{11} = -0.5445$ | | |
| $d_{11} = 0.002$ | | |
| $r_{12} = 0.5060$ | | |
| $d_{12} = 0.026$ | $n_8 = 1.497$ | $\nu_8 = 81.61$ |
| $r_{13} = 0.7310$ | | |
| $d_{13} = 0.050 \sim 0.570$ | | |
| $r_{14} = 1.0314$ | | |
| $d_{14} = 0.019$ | $n_9 = 1.7552$ | $\nu_9 = 27.51$ |
| $r_{15} = 0.4415$ | | |
| $d_{15} = 0.032$ | | |
| $r_{16} = -0.2832$ | | |
| $d_{16} = 0.019$ | $n_{10} = 1.57135$ | $\nu_{10} = 52.92$ |
| $r_{17} = 0.2819$ | | |
| $d_{17} = 0.041$ | $n_{11} = 1.61659$ | $\nu_{11} = 36.63$ |
| $r_{18} = -0.3990$ | | |

$f_{II} = -0.301 \times f_I$, $f_{III} = 0.541 \times f_I$
$f_{IV} = -0.809 \times f_I$, $\nu_{1T} - \nu_{1O} = 40.81$
$\nu_{2O} - \nu_{2T} = 28.65$, $\nu_{3T} - \nu_{3O} = 43.33$
$\nu_{4O} - \nu_{4T} = 3.57$, $n_{1O} - n_{1T} = 0.1475$
$n_{2T} - n_{2O} = 0.11543$, $n_{3O} - n_{3T} = 0.28553$
$r_{1F}/r_{1R} = -0.480$, $r_{3F}/r_{3R} = -1.098$
$r_{4R}/r_{4F} = 1.409$, $r_{3F}/f_{III} = 0.99$

Embodiment 8 -continued $n_{2O} = 1.63977$, $n_{4O} = 1.66328$

Embodiment 10

| | | |
|---|---|---|
| $f = 1 \sim 8.5$ | | |
| $r_1 = 0.7258$ | | |
| $d_1 = 0.041$ | $n_1 = 1.51728$ | $\nu_1 = 69.56$ |
| $r_2 = -0.5836$ | | |
| $d_2 = 0.024$ | $n_2 = 1.85026$ | $\nu_2 = 32.28$ |
| $r_3 = -1.1102$ | | |
| $d_3 = 0.051 \sim 0.582$ | | |
| $r_4 = -1.9238$ | | |
| $d_4 = 0.028$ | $n_3 = 1.7552$ | $\nu_3 = 27.51$ |
| $r_5 = -0.2808$ | | |
| $d_5 = 0.019$ | $n_4 = 1.641$ | $\nu_4 = 56.93$ |
| $r_6 = 0.7522$ | | |
| $d_6 = 0.012$ | | |
| $r_7 = -0.5216$ | | |
| $d_7 = 0.019$ | $n_5 = 1.63854$ | $\nu_5 = 55.38$ |
| $r_8 = 0.7149$ | | |
| $d_8 = 1.112 \sim 0.107$ | | |
| $r_9 = 0.7167$ | | |
| $d_9 = 0.019$ | $n_6 = 1.80518$ | $\nu_6 = 25.43$ |
| $r_{10} = 0.3638$ | | |
| $d_{10} = 0.036$ | $n_7 = 1.59137$ | $\nu_7 = 56.4$ |
| $r_{11} = -0.5358$ | | |
| $d_{11} = 0.002$ | | |
| $r_{12} = 0.4508$ | | |
| $d_{12} = 0.026$ | $n_8 = 1.497$ | $\nu_8 = 81.61$ |
| $r_{13} = 0.7465$ | | |
| $d_{13} = 0.043 \sim 0.578$ | | |
| $r_{14} = 1.2661$ | | |
| $d_{14} = 0.019$ | $n_9 = 1.7552$ | $\nu_9 = 27.51$ |
| $r_{15} = 0.4683$ | | |
| $d_{15} = 0.023$ | | |
| $r_{16} = -0.2974$ | | |
| $d_{16} = 0.019$ | $n_{10} = 1.57957$ | $\nu_{10} = 53.71$ |
| $r_{17} = 0.2974$ | | |
| $d_{17} = 0.044$ | $n_{11} = 1.61659$ | $\nu_{11} = 36.63$ |
| $r_{18} = -0.3968$ | | |

$f_{II} = -0.299 \times f_I$, $f_{III} = 0.54 \times f_I$
$f_{IV} = -0.821 \times f_I$, $\nu_{1T} - \nu_{1O} = 37.28$
$\nu_{2O} - \nu_{2T} = 28.65$, $\nu_{3T} - \nu_{3O} = 43.58$
$\nu_{4O} - \nu_{4T} = 3.97$, $n_{1O} - n_{1T} = 0.33298$
$n_{2T} - n_{2O} = 0.11543$, $n_{3O} - n_{3T} = 0.30599$
$r_{1F}/r_{1R} = -0.654$, $r_{3F}/r_{3R} = -1.338$
$r_{4R}/r_{4F} = 1.334$, $r_{3F}/f_{III} = 1.197$
$n_{2O} = 1.63977$, $n_{4O} = 1.66739$

Embodiment 11

| | | |
|---|---|---|
| $f = 1 \sim 8.5$ | | |
| $r_1 = 0.6603$ | | |
| $d_1 = 0.041$ | $n_1 = 1.50137$ | $\nu_1 = 56.4$ |
| $r_2 = -0.5920$ | | |
| $d_2 = 0.024$ | $n_2 = 1.76182$ | $\nu_2 = 26.52$ |
| $r_3 = -1.2931$ | | |
| $d_3 = 0.035 \sim 0.505$ | | |
| $r_4 = 9.7907$ | | |
| $d_4 = 0.033$ | $n_3 = 1.78472$ | $\nu_3 = 25.71$ |
| $r_5 = -0.2700$ | | |
| $d_5 = 0.019$ | $n_4 = 1.6425$ | $\nu_4 = 58.37$ |
| $r_6 = 0.6562$ | | |
| $d_6 = 0.012$ | | |
| $r_7 = -0.4096$ | | |
| $d_7 = 0.019$ | $n_5 = 1.63636$ | $\nu_5 = 35.37$ |
| $r_8 = 0.5871$ | | |
| $d_8 = 1.080 \sim 0.076$ | | |
| $r_9 = 0.9454$ | | |
| $d_9 = 0.019$ | $n_6 = 1.80518$ | $\nu_6 = 25.43$ |
| $r_{10} = 0.3961$ | | |
| $d_{10} = 0.040$ | $n_7 = 1.50137$ | $\nu_7 = 56.4$ |
| $r_{11} = -0.4613$ | | |
| $d_{11} = 0.002$ | | |
| $r_{12} = 0.4050$ | | |
| $d_{12} = 0.022$ | $n_8 = 1.497$ | $\nu_8 = 81.61$ |

-continued

Embodiment 11

$r_{13} = 0.6706$
$d_{13} = 0.029 \sim 0.563$
$r_{14} = 0.8435$
$d_{14} = 0.019$    $n_9 = 1.74$    $v_9 = 28.29$
$r_{15} = 0.4287$
$d_{15} = 0.019$
$r_{16} = -0.3421$
$d_{16} = 0.019$    $n_{10} = 1.55671$    $v_{10} = 58.68$
$r_{17} = 0.3206$
$d_{17} = 0.044$    $n_{11} = 1.62004$    $v_{11} = 36.25$
$r_{18} = -0.5842$
$f_{II} = -0.299 \times f_I, f_{III} = 0.540 \times f_I$
$f_{IV} = -0.821 \times f_I, v_{1T} - v_{1O} = 29.88$
$v_{2O} - v_{2T} = 21.16, v_{3T} - v_{3O} = 43.58$
$v_{4O} - v_{4T} = 7.24, n_{1O} - n_{1T} = 0.26045$
$n_{2T} - n_{2O} = 0.14529, n_{3O} - n_{3T} = 0.30600$
$r_{1F}/r_{1R} = -0.511, r_{3F}/r_{3R} = -2.049$
$r_{4R}/r_{4F} = 1.708, r_{3F}/f_{III} = -1.580$
$n_{2O} = 1.63943, n_{4O} = 1.64836$ In embodiments shown in the above, reference symbols $r_1$ through $r_{18}$ respectively represent radii of curvature of respective lens surfaces, reference symbols $d_1$ through $d_{17}$ respectively represent thicknesses of respective lenses and airspaces between respective lenses, reference symbols $n_1$ through $n_{11}$ respective represent refractive indices of respective lenses, and reference symbols $v_1$ through $v_{11}$ respectively represent Abbe's numbers of respective lenses.

Figure 3:
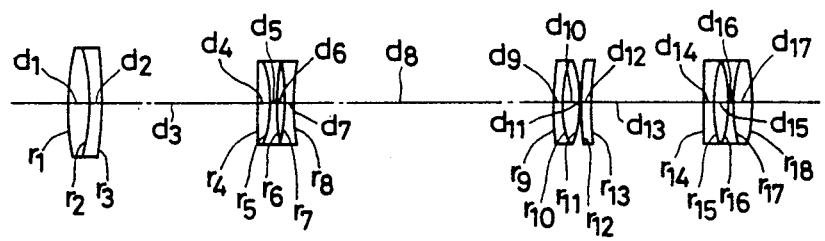
FIG. 3 shows a sectional view of Embodiments 1 through 11 of the afocal zoom lens system according to the present invention.
Figure 4:
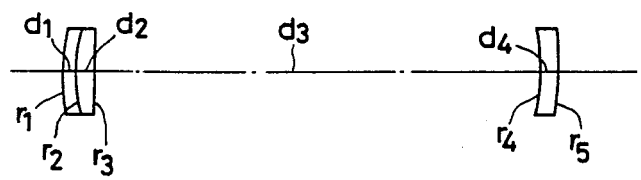
FIG. 4 shows an example of an imaging lens system to be used in combination with the afocal zoom lens system according to the present invention.
Figure 2A:
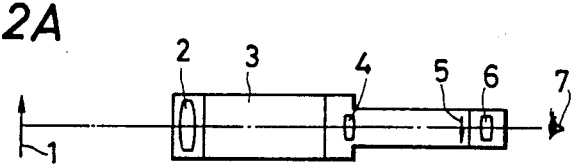
FIGS. 2A, 2B, 2C and 2D respectively show various examples of use of the afocal zoom lens system according to the present invention.
Figure 2B:
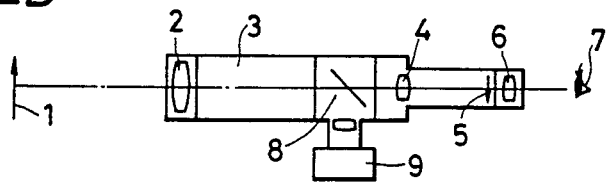
Figure 2C:
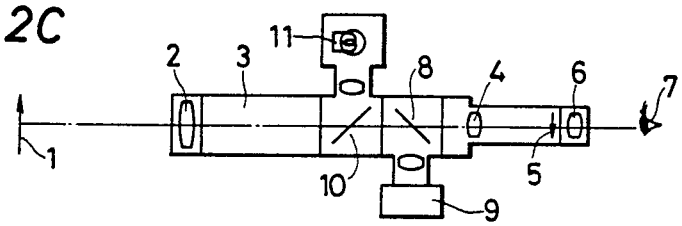
Figure 2D:
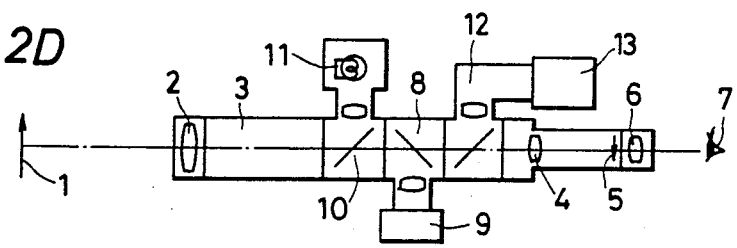
Figure 14:
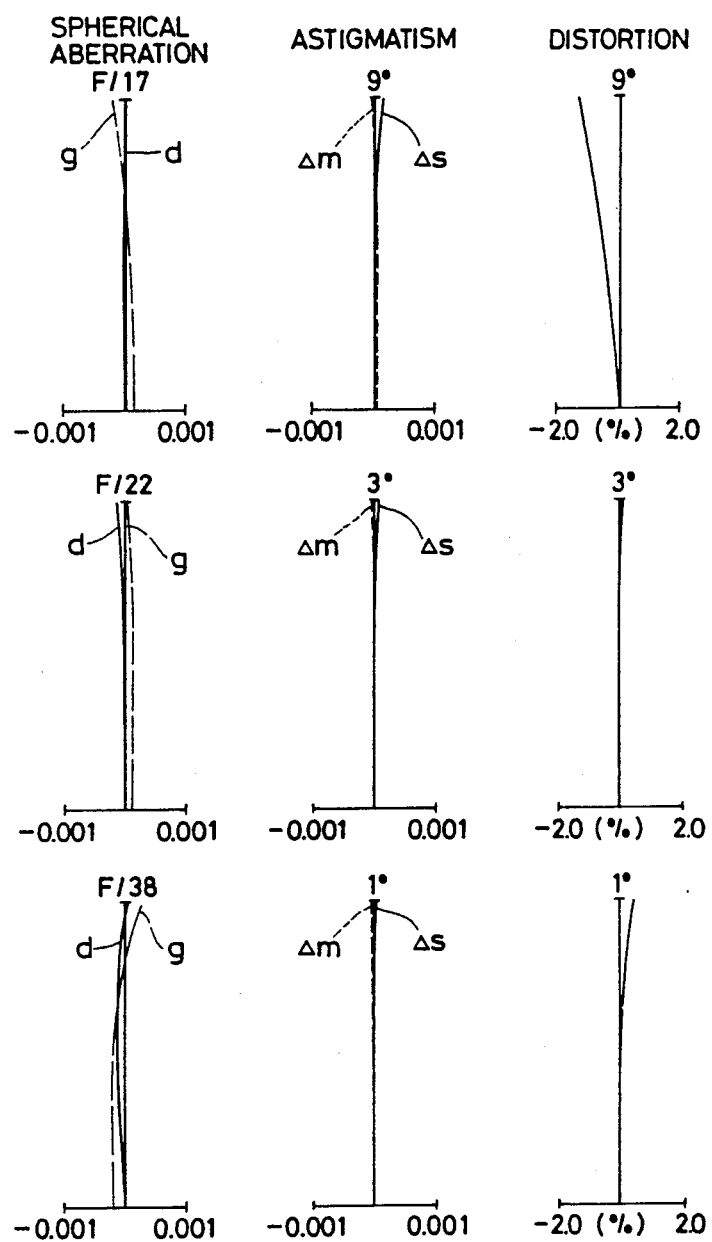
Figure 15:
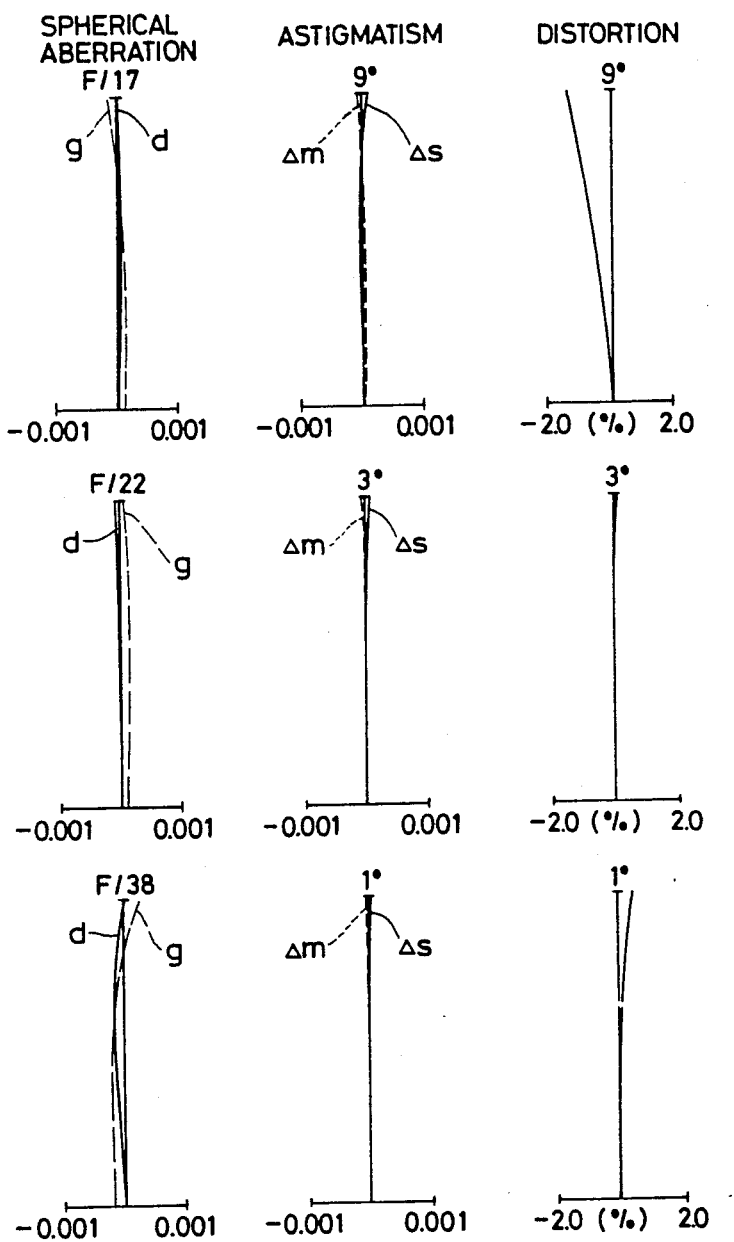

These embodiments respectively have the lens configuration as shown in FIG. 3 and, as the zoom lens system according to the present invention is an afocal lens system, the numerical data of respective embodiments are arranged that, when combined with an imaging lens system having the lens configuration as shown in FIG. 4 and having the following numerical data, the total focal length f of the lens system as a whole in the wide position becomes 1.

$r_1 = 0.5002$
$d_1 = 0.027$    $n_1 = 1.8061$    $v_1 = 40.95$
$r_2 = 0.3652$
$d_2 = 0.038$    $n_2 = 1.48749$    $v_2 = 70.15$
$r_3 = 2.8677$
$d_3 = 0.959$
$r_4 = -0.4091$
$d_4 = 0.027$    $n_3 = 1.48749$    $v_3 = 70.15$
$r_5 = -0.8493$
$f_F = 2.786,$    $S_F = 1.061$

In the numerical data of the imaging lens system shown in the above, reference symbols $f_F$ and $S_F$ respectively represent the focal length and image position of the imaging lens system.

Aberration curves of Embodiments 1 through 11 shown in the above are respectively shown in FIGS. 5 through 15. Graphs of aberration curves in these figures show the aberration curves respectively in the wide position, standard position and teleposition when Embodiments 1 through 11 of the present invention are respectively combined with the imaging lens system shown in the above.

As described in detail so far and as it will be evident from respective embodiments, the afocal zoom lens system according to the present invention has a large zoom ratio, and aberrations thereof are corrected favourably.

Besides, as the zoom lens system according to the present invention is an afocal lens system, it is possible to use it in various magnification ranges according to selection of the objective and imaging lens system to be used in combination and, therefore, it is possible to use it in the manners suitable for respective purposes of application. Moreover, by using the afocal zoom lens system according to the present invention in combination with an incident light illumination system provided coaxially, a photographing device, a discussion microscope, etc., it is possible to systematically perform various kinds of observation according to the wide variety of purposes of application.

We claim:

1. An afocal zoom lens system comprising, a first lens group having a positive refractive power, a second lens group having a negative refractive power, a third lens group having a positive refractive power, and a fourth lens group having a negative refractive power with said fourth lens group being farthest from an objective, the third being between the fourth and the objective, the second being between the third and the objective, said afocal zoom lens system being arranged to vary the focal length of said lens system by respectively varying the airspace between the first and second lens groups, the airspace between the second and third lens groups, and the airspace between the third and fourth lens groups, said a focal zoom lens system being arranged to fulfill the conditions (1) through (3) shown below:

$$-0.35 \times f_I < f_{II} < -0.25 \times f_I \quad (1)$$

$$0.4 \times f_I < f_{III} < 0.6 \times f_I \quad (2)$$

$$-1 \times f_I < f_{IV} < -0.6 \times f_I \quad (3)$$

where, reference symbols $f_I$, $f_{II}$, $f_{III}$ and $f_{IV}$ respectively represent focal lengths of the first, second, third and fourth lens groups.

2. An afocal zoom lens system according to claim 1, wherein said first lens group comprises one positive cemented doublet consisting of a positive lens element and a negative lens element, said second lens group comprises one negative cemented doublet consisting of a positive lens element and a negative lens element, said third lens group comprises one positive cemented doublet consisting of a negative lens element and a positive lens element, and said fourth lens group comprises one negative cemented meniscus doublet consisting of a negative lens element and a positive lens element.

3. An afocal zoom lens systme according to claim 2, further fulfilling the conditions (4) through (7) shown below:

$$25 < v_1T - v_1 0 \quad (4)$$

$$20 < v_2T - v_2 0 \quad (5)$$

$$35 < v_3T - v_3 0 \quad (6)$$

$$0 < v_4T - v_4 0 \quad (7)$$

where, reference symbol $v_1$ T, $v_2$ T, $v_3$ T and $v_4$ T respectively represent mean values of Abbe's numbers of positive lens elements respectively constituting the first, second, third and fourth lens groups, and reference symbols $v_1$ 0, $v_2$ 0, $v_3$ 0 and $v_4$ 0 respectively represent mean values of Abbe's numbers of negative lens elements respectively constituting the first, second, third and fourth lens groups.

4. An afocal zoom lens system according to claim 2, wherein said second lens group further comprises a negative lens component, said third lens group further comprises a positive lens component, and said fourth lens group further comprises a negative lens component.

5. An afocal zoom lens system according to claim 4, further fulfilling the conditions (4) through (7) shown below:

$$25 < \nu_1 T - \nu_1 0 \quad (4)$$

$$20 < \nu_2 T - \nu_2 0 \quad (5)$$

$$35 < \nu_3 T - \nu_3 0 \quad (6)$$

$$0 < \nu_4 T - \nu_4 0 \quad (7)$$

where, reference symbol $\nu_1 T$, $\nu_2 T$, $\nu_3 T$, and $\nu_4 T$ respectively represent mean values of Abbe's numbers of posiive lens elements respectively constituting the first, second, third and fourth lens groups, and reference symbols $\nu_1 0$, $\nu_2 0$, $\nu_3 0$ and $\nu_4 0$ respectively represent mean values of Abbe's numbers of negative lens elements respectively constituting the first, second, third and fourth lens groups.

6. An afocal zoom lens system according to claim 1 further fulfilling the conditions (8) through (10) shown below:

$$0.1 < n_1 0 - n_1 T \quad (8)$$

$$n_2 T - n_2 0 < 0.25 \quad (9)$$

$$0.2 < n_3 0 - n_3 T \quad (10)$$

where, reference symbols $n_1 T$, $n_2 T$ and $n_3 T$ respectively represent mean values of refractive indices of positive lens elements respectively constituting the first, second and third lens groups, and reference symbols $n_1 0$, $n_2 0$ and $n_3 0$ respectively represent mean values of refractive indices of negative lens elements respectively constituting the first, second and third lens groups.

7. An afocal zoom lens system according to claim 6 further fulfilling the conditions (11) through (13) shown below:

$$-1 < r_{1F}/r_{1R} < -0.3 \quad (11)$$

$$r_{3F}/r_{3R} < 0 \quad (12)$$

$$1 < r_{4R}/r_{4F} < 3 \quad (13)$$

ps where, reference symbols $r_{1F}$ and $r_{1R}$ respectively represent radii of curvature of the surface on the object side and surface on the image side of the positive cemented doublet constituting the first lens group, reference symbols $r_{3F}$ and $r_{3R}$ respectively represent radii of curvature of the surface on the object side and surface on the image side of the positive cemented doublet constituting the third lens group, and reference symbols $r_{4F}$ and $r_{4R}$ respectively represent radii of curvature of the surface on the object side and surface on the image side of the negative cemented doublet constituting the fourth lens group.

8. An afocal zoom lens system according to claim 7 further fulfilling the conditions (14) through (16) shown below:

$$0.5 < r_{3F}/f_{III} \quad (14)$$

$$1.54 < n_2 0 \quad (15)$$

$$1.57 < n_4 0 \quad (16)$$

ps where, reference symbol $n_4 0$ represents the mean value of refractive indices of negative lens elements constituting the fourth lens group.

9. An afocal zoom lens system according to claim 8 wherein said first lens group comprises a positive cemented doublet, said second lens group comprises a negative cemented doublet, which consists of a positive lens element and a negative lens element, and a negative lens component, said third lens group comprises a positive cemented doublet, which consists of a negative lens element and a positive lens element, and a positive lens component, and said fourth lens group comprises a negative lens component and a negative cemented meniscus doublet, which consists of a negative lens element and a positive lens element, said afocal zoom lens system having the following numerical data:

| | | |
|---|---|---|
| $f = 1 \sim 8.5$ | | |
| $r_1 = 0.6433$ | | |
| $d_1 = 0.040$ | $n_1 = 1.48749$ | $\nu_1 = 70.2$ |
| $r_2 = -0.5318$ | | |
| $d_2 = 0.025$ | $n_2 = 1.71852$ | $\nu_2 = 33.5$ |
| $r_3 = -1.1600$ | | |
| $d_3 = 0.030 \sim 0.493$ | | |
| $r_4 = -1.2264$ | | |
| $d_4 = 0.025$ | $n_3 = 1.78472$ | $\nu_3 = 25.7$ |
| $r_5 = -0.3422$ | | |
| $d_5 = 0.019$ | $n_4 = 1.48749$ | $\nu_4 = 70.2$ |
| $r_6 = 0.5427$ | | |
| $d_6 = 0.031$ | | |
| $r_7 = -0.3931$ | | |
| $d_7 = 0.019$ | $n_5 = 1.6228$ | $\nu_5 = 57.1$ |
| $r_8 = 0.6539$ | | |
| $d_8 = 1.014 \sim 0.099$ | | |
| $r_9 = 0.4629$ | | |
| $d_9 = 0.020$ | $n_6 = 1.74$ | $\nu_6 = 28.3$ |
| $r_{10} = 0.2683$ | | |
| $d_{10} = 0.041$ | $n_7 = 1.4645$ | $\nu_7 = 65.9$ |
| $r_{11} = -0.5143$ | | |
| $d_{11} = 0.002$ | | |
| $r_{12} = 0.6598$ | | |
| $d_{12} = 0.020$ | $n_8 = 1.48749$ | $\nu_8 = 70.2$ |
| $r_{13} = 1.5338$ | | |
| $d_{13} = 0.093 \sim 0.544$ | | |
| $r_{14} = 3.2732$ | | |
| $d_{14} = 0.020$ | $n_9 = 1.78472$ | $\nu_9 = 25.7$ |
| $r_{15} = 0.5110$ | | |
| $d_{15} = 0.045$ | | |
| $r_{16} = -0.2105$ | | |
| $d_{16} = 0.020$ | $n_{10} = 1.58904$ | $\nu_{10} = 53.2$ |
| $r_{17} = 0.2374$ | | |
| $d_{17} = 0.053$ | $n_{11} = 1.60342$ | $\nu_{11} = 38.0$ |
| $r_{18} = -0.2624$ | | |
| $f_{II} = -0.284 \times f_I$, $f_{III} = 0.499 \times f_I$ | | |
| $f_{IV} = -0.714 \times f_I$, $\nu_{1T} - \nu_{1O} = 36.7$ | | |
| $\nu_{2O} - \nu_{2T} = 37.9$, $\nu_{3T} - \nu_{3O} = 39.8$ | | |
| $\nu_{4O} - \nu_{4T} = 13.8$, $n_{1O} - n_{1T} = 0.23103$ | | |
| $n_{2T} - n_{2O} = 0.22957$, $n_{3O} - n_{3T} = 0.264$ | | |
| $r_{1F}/r_{1R} = -0.555$, $r_{3F}/r_{3R} = -0.900$ | | |
| $r_{4R}/r_{4F} = 1.247$, $r_{3F}/f_{III} = 0.869$ | | |
| $n_{2O} = 1.55515$, $n_{4O} = 1.68688$ | | | where, reference symbols $r_1$ through $r_{18}$ respectively represent radii of curvature of respective lens surfaces, reference symbols $d_1$ through $d_{17}$ respectively represent thicknesses of respective lenses and airspaces between respective lenses, reference symbols $n_1$ through $n_{11}$ respectively represent refractive indices of respective lenses, and reference symbols $\nu_1$ through $\nu_{11}$ respectively represent Abbe's numbers of respective lenses.

10. An afocal zoom lens system according to claim 8 wherein said first lens group comprises a positive cemented doublet, said second lens group comprises a negative cemented doublet, which consists of a positive lens element and a negative lens element, and a negative lens component, said third lens group comprises a positive cemented doublet, which consists of a negative lens element and a positive lens element, and a positive lens component, and said fourth lens group comprises a negative lens component and a negative cemented meniscus doublet, which consists of a negative lens element and a positive lens element, said afocal zoom lens system having the following numerical data:

```
f = 1~8.5
r1 = 0.7084
d1 = 0.041         n1 = 1.48749    ν1 = 70.2
r2 = −0.4971
d2 = 0.027         n2 = 1.68893    ν2 = 31.1
r3 = −1.0800
d3 = 0.027~0.503
r4 = −1.2765
d4 = 0.027         n3 = 1.78472    ν3 = 25.7
r5 = −0.3023
d5 = 0.019         n4 = 1.48749    ν4 = 70.2
r6 = 0.6301
d6 = 0.029
r7 = −0.3473
d7 = 0.019         n5 = 1.62280    ν5 = 57.1
r8 = 0.6646
d8 = 1.046~0.104
r9 = 0.5261
d9 = 0.020         n6 = 1.69895    ν6 = 30.1
r10 = 0.2696
d10 = 0.042        n7 = 1.48749    ν7 = 70.2
r11 = −0.5369
d11 = 0.002
r12 = 0.4993
d12 = 0.020        n8 = 1.48749    ν8 = 70.2
r13 = 0.8153
d13 = 0.086~0.553
r14 = 1.0709
d14 = 0.020        n9 = 1.76182    ν9 = 26.5
r15 = 0.3729
d15 = 0.046
r16 = −0.2144
d16 = 0.020        n10 = 1.57135   ν10 = 52.9
r17 = 0.2915
d17 = 0.048        n11 = 1.61659   ν11 = 36.6
r18 = −0.2814
fII = −0.286 × fI, fIII = 0.502 × fI
fIV = −0.718 × fI, ν1T − ν10 = 39.1
ν2O − ν2T = 37.9, ν3T − ν3O = 40.0
ν4O − ν4T = 3.09, n1O − n1T = 0.20144
n2T − n2O = 0.22957, n3O − n3T = 0.21146
r1F/r1R = −0.656, r3F/r3R = −0.980
r4R/r4F = 1.312, r3F/fIII = 0.958
n2O = 1.55515, n4O = 1.66659
``` where, reference symbols $r_1$ through $r_{18}$ respectively represent radii of curvature of respective lens surfaces, reference symbols $d_1$ through $d_{17}$ respectively represent thicknesses of respective lenses and airspaces between respective lenses, reference symbols $n_1$ through $n_{11}$ respectively represent refractive indices of respective lenses, and reference symbols $\nu_1$ through $\nu_{11}$ respectively represent Abbe's numbers of respective lenses.

11. An afocal zoom lens system according to claim 8 wherein said first lens group comprises a positive cemented doublet, said second lens group comprises a negative cemented doublet, which consists of a positive lens element and a negative lens element, and a negative lens component, said third lens group comprises a positive cemented doublet, which consists of a negative lens element and a positive lens element, and a positive lens component, and said fourth lens group comprises a negative lens component and a negative cemented meniscus doublet, which consists of a negative lens element and a positive lens element, said afocal zoom lens system having the following numerical data:

```
f = 1~8.5
r1 = 0.6961
d1 = 0.036         n1 = 1.48749    ν1 = 70.2
r2 = −0.6168
d2 = 0.020         n2 = 1.68893    ν2 = 31.1
r3 = −1.4581
d3 = 0.032~0.553
r4 = −0.6233
d4 = 0.027         n3 = 1.68893    ν3 = 31.1
r5 = −0.1986
d5 = 0.015         n4 = 1.617      ν4 = 62.8
r6 = 1.3167
d6 = 0.020
r7 = −1.0605
d7 = 0.013         n5 = 1.618      ν5 = 63.4
r8 = 0.7140
d8 = 1.099~0.026
r9 = 0.9852
d9 = 0.022         n6 = 1.72151    ν6 = 29.2
r10 = 0.4857
d10 = 0.042        n7 = 1.497      ν7 = 81.6
r11 = −0.6691
d11 = 0.003
r12 = 0.9359
d12 = 0.038        n8 = 1.497      ν8 = 81.6
r13 = −6.6689
d13 = 0.110~0.663
r14 = −1.7152
d14 = 0.015        n9 = 1.6968     ν9 = 55.5
r15 = 0.9348
d15 = 0.023
r16 = −0.3374
d16 = 0.017        n10 = 1.48749   ν10 = 70.2
r17 = 0.4072
d17 = 0.050        n11 = 1.5928    ν11 = 35.3
r18 = −0.5438
fII = −0.306 × fI, fIII = −0.528 × fI
fIV = −0.743 × fI, ν1T − ν10 = 39.1
ν2O − ν2T = 32.0, ν3T − ν3O = 52.4
ν4O − ν4T = 27.55, n1O − n1T = 0.20144
n2T − n2O = 0.07143, n3O − n3T = 0.22451
r1F/r1R = −0.477, r3F/r3R = −1.472
r4R/r4F = 1.612, r3F/fIII = 1.572
n2O = 1.6175, n4O = 1.59215
``` where, reference symbols $r_1$ through $r_{18}$ respectively represent radii of curvature of respective lens surfaces, reference symbols $d_1$ through $d_{17}$ respectively represent thicknesses of respective lenses and airspaces between respective lenses, reference symbols $n_1$ through $n_{11}$ respectively represent refractive indices of respective lenses, and reference symbols $\nu_1$ through $\nu_{11}$ respectively represent Abbe's numbers of respective lenses.

12. An afocal zoom lens system according to claim 8 wherein said first lens group comprises a positive cemented doublet, said second lens group comprises a negative cemented doublet, which consists of a positive lens element and a negative lens element, and a negative lens component, said third lens group comprises a positive cemented doublet, which consists of a negative lens element and a positive lens element, and a positive lens component, and said fourth lens group comprises a negative lens component and a negative cemented meniscus doublet, which consists of a negative lens element and a positive lens element, said afocal zoom lens system having the following numerical data:

```
f = 1~8.5
r1 = 0.4890
d1 = 0.044         n1 = 1.48749    ν1 = 70.2
r2 = −0.5133
d2 = 0.025         n2 = 1.74       ν2 = 31.7
```

-continued

| | | |
|---|---|---|
| $r_3 = -1.2298$ | | |
| $d_3 = 0.028 \sim 0.415$ | | |
| $r_4 = -1.7147$ | | |
| $d_4 = 0.026$ | $n_3 = 1.78472$ | $\nu_3 = 25.7$ |
| $r_5 = -0.2409$ | | |
| $d_5 = 0.019$ | $n_4 = 1.72916$ | $\nu_4 = 54.7$ |
| $r_6 = 0.6446$ | | |
| $d_6 = 0.02$ | | |
| $r_7 = -0.6745$ | | |
| $d_7 = 0.019$ | $n_5 = 1.6968$ | $\nu_5 = 56.5$ |
| $r_8 = 0.5799$ | | |
| $d_8 = 0.899 \sim 0.067$ | | |
| $r_9 = 30.6851$ | | |
| $d_9 = 0.02$ | $n_6 = 1.78472$ | $\nu_6 = 25.7$ |
| $r_{10} = 0.8484$ | | |
| $d_{10} = 0.029$ | $n_7 = 1.497$ | $\nu_7 = 81.6$ |
| $r_{11} = -0.4200$ | | |
| $d_{11} = 0.001$ | | |
| $r_{12} = 0.6021$ | | |
| $d_{12} = 0.026$ | $n_8 = 1.497$ | $\nu_8 = 81.6$ |
| $r_{13} = -1.9742$ | | |
| $d_{13} = 0.058 \sim 0.503$ | | |
| $r_{14} = 1.0666$ | | |
| $d_{14} = 0.02$ | $n_9 = 1.8044$ | $\nu_9 = 39.6$ |
| $r_{15} = 0.4589$ | | |
| $d_{15} = 0.042$ | | |
| $r_{16} = -0.2689$ | | |
| $d_{16} = 0.02$ | $n_{10} = 1.51118$ | $\nu_{10} = 51.0$ |
| $r_{17} = 0.3069$ | | |
| $d_{17} = 0.042$ | $n_{11} = 1.5927$ | $\nu_{11} = 35.3$ |
| $r_{18} = -0.5009$ | | |
| $f_{II} = -0.296 \times f_I, f_{III} = 0.563 \times f_I$ | | |
| $f_{IV} = -0.838 \times f_I, \nu_{1T} - \nu_{1O} = 38.5$ | | |
| $\nu_{2O} - \nu_{2T} = 29.9, \nu_{3T} - \nu_{3O} = 55.9$ | | |
| $\nu_{4O} - \nu_{4T} = 10.01, n_{1O} - n_{1T} = 0.25251$ | | |
| $n_{2T} - n_{2O} = 0.07174, n_{3O} - n_{3T} = 0.28772$ | | |
| $r_{1F}/r_{1R} = -0.398, r_{3F}/r_{3R} = -73.068$ | | |
| $r_{4R}/r_{4F} = 1.863, r_{3F}/f_{III} = 59.867$ | | |
| $n_{2O} = 1.71298, n_{4O} = 1.65779$ | | | where, reference symbols $r_1$ through $r_{18}$ respectively represent radii of curvature of respective lens surfaces, reference symbols $d_1$ through $d_{17}$ respectively represent thicknesses of respective lenses and airspaces between respective lenses, reference symbols $n_1$ through $n_{11}$ respectively represent refractive indices of respective lenses, and reference symbols $\nu_1$ through $\nu_{11}$ respective represent Abbe's numbers of respective lenses.

13. An afocal zoom lens system according to claim 8 wherein said first lens group comprises a positive cemented doublet, said second lens group comprises a negative cemented doublet, which consists of a positive lens element and a negative lens element, and a negative lens component, said third lens group comprises a positive cemented doublet, which consists of a negative lens element and a positive lens element, and positive lens component, and said fourth lens group comprises a negative lens component and a negative cemented meniscus doublet. which consists of a negative lens element and a positive lens element, said afocal zoom lens system having the following numerical data:

| | | |
|---|---|---|
| $f = 1 \sim 8.5$ | | |
| $r_1 = 0.9250$ | | |
| $d_1 = 0.037$ | $n_1 = 1.48749$ | $\nu_1 = 70.2$ |
| $r_2 = -0.4910$ | | |
| $d_2 = 0.025$ | $n_2 = 1.66446$ | $\nu_2 = 35.7$ |
| $r_3 = -1.0438$ | | |
| $d_3 = 0.039 \sim 0.594$ | | |
| $r_4 = -1.1582$ | | |
| $d_4 = 0.028$ | $n_3 = 1.69895$ | $\nu_3 = 30.1$ |
| $r_5 = -0.2321$ | | |
| $d_5 = 0.016$ | $n_4 = 1.6425$ | $\nu_4 = 58.4$ |
| $r_6 = 0.9213$ | | |
| $d_6 = 0.019$ | | |

-continued

| | | |
|---|---|---|
| $r_7 = -0.6726$ | | |
| $d_7 = 0.016$ | $n_5 = 1.6425$ | $\nu_5 = 58.4$ |
| $r_8 = 1.1459$ | | |
| $d_8 = 1.197 \sim 0.070$ | | |
| $r_9 = 0.8980$ | | |
| $d_9 = 0.022$ | $n_6 = 1.72825$ | $\nu_6 = 28.5$ |
| $r_{10} = 0.4415$ | | |
| $d_{10} = 0.037$ | $n_7 = 1.497$ | $\nu_7 = 81.6$ |
| $r_{11} = -0.6773$ | | |
| $d_{11} = 0.003$ | | |
| $r_{12} = 0.8232$ | | |
| $d_{12} = 0.033$ | $n_8 = 1.497$ | $\nu_8 = 81.6$ |
| $r_{13} = 4.7356$ | | |
| $d_{13} = 0.049 \sim 0.622$ | | |
| $r_{14} = 2.2417$ | | |
| $d_{14} = 0.021$ | $n_9 = 1.74$ | $\nu_9 = 31.7$ |
| $r_{15} = 0.6773$ | | |
| $d_{15} = 0.029$ | | |
| $r_{16} = -0.3326$ | | |
| $d_{16} = 0.021$ | $n_{10} = 1.50847$ | $\nu_{10} = 60.8$ |
| $r_{17} = 0.3326$ | | |
| $d_{17} = 0.040$ | $n_{11} = 1.5927$ | $\nu_{11} = 35.3$ |
| $r_{18} = -0.6358$ | | |
| $f_{II} = -0.302 \times f_I, f_{III} = 0.530 \times f_I$ | | |
| $f_{IV} = -0.781 \times f_I, \nu_{1T} - \nu_{1O} = 34.4$ | | |
| $\nu_{2O} - \nu_{2T} = 28.3, \nu_{3T} - \nu_{3O} = 53.2$ | | |
| $\nu_{4O} - \nu_{4T} = 11.0, n_{1O} - n_{1T} = 0.17697$ | | |
| $n_{2T} - n_{2O} = 0.05645, n_{3O} - n_{3T} = 0.23125$ | | |
| $r_{1F}/r_{1R} = -0.886, r_{3F}/r_{3R} = -1.326$ | | |
| $r_{4R}/r_{4F} = 1.912, r_{3F}/f_{III} = 1.352$ | | |
| $n_{2O} = 1.6425, n_{4O} = 1.62424$ | | | where, reference symbols $r_1$ through $r_{18}$ respectively represent radii of curvature of respective lens surfaces, reference symbols $d_1$ through $d_{17}$ respectively represent thicknesses of respective lenses and airspaces between respective lenses, reference symbols $n_1$ through $n_{11}$ respectively represent refractive indices of respective lenses, and reference symbols $\nu_1$ through $\nu_{11}$ respectively represent Abbe's numbers of respective lenses.

14. An afocal zoom lens system according to claim 8 wherein said first lens group comprises a positive cemented doublet, said second lens group comprises a negative cemented doublet, which consists of a positive lens element and a negative lens element, and a negative lens component, said third lens group comprises a positive cemented doublet, which consists of a negative lens element and a positive lens element, and a positive lens component, and said fourth lens group comprises a negative lens component and a negative cemented meniscus doublet, which consists of a negative lens element and a positive lens element, said afocal zoom lens system having the following numerical data:

| | | |
|---|---|---|
| $f = 1 \sim 8.5$ | | |
| $r_1 = 0.6785$ | | |
| $d_1 = 0.041$ | $n_1 = 1.497$ | $\nu_1 = 81.6$ |
| $r_2 = -0.4757$ | | |
| $d_2 = 0.025$ | $n_2 = 1.6445$ | $\nu_2 = 40.8$ |
| $r_3 = -1.2253$ | | |
| $d_3 = 0.042 \sim 0.503$ | | |
| $r_4 = -0.8372$ | | |
| $d_4 = 0.025$ | $n_3 = 1.78472$ | $\nu_3 = 25.7$ |
| $r_5 = -0.2964$ | | |
| $d_5 = 0.019$ | $n_4 = 1.48749$ | $\nu_4 = 70.2$ |
| $r_6 = 0.6364$ | | |
| $d_6 = 0.015$ | | |
| $r_7 = -0.4158$ | | |
| $d_7 = 0.019$ | $n_5 = 1.6228$ | $\nu_5 = 57.1$ |
| $r_8 = 0.6018$ | | |
| $d_8 = 1.010 \sim 0.100$ | | |
| $r_9 = 0.4625$ | | |
| $d_9 = 0.020$ | $n_6 = 1.74$ | $\nu_6 = 28.3$ |
| $r_{10} = 0.2689$ | | |
| $d_{10} = 0.041$ | $n_7 = 1.4645$ | $\nu_7 = 65.9$ |

| | | |
|---|---|---|
| $r_{11} = -0.5255$ | | |
| $d_{11} = 0.002$ | | |
| $r_{12} = 0.6642$ | | |
| $d_{12} = 0.020$ | $n_8 = 1.48749$ | $\nu_8 = 70.2$ |
| $r_{13} = 1.7010$ | | |
| $d_{13} = 0.103 \sim 0.553$ | | |
| $r_{14} = 3.0806$ | | |
| $d_{14} = 0.02$ | $n_9 = 1.78472$ | $\nu_9 = 25.7$ |
| $r_{15} = 0.4844$ | | |
| $d_{15} = 0.031$ | | |
| $r_{16} = -0.1911$ | | |
| $d_{16} = 0.02$ | $n_{10} = 1.58904$ | $\nu_{10} = 53.2$ |
| $r_{17} = 0.2760$ | | |
| $d_{17} = 0.053$ | $n_{11} = 1.60342$ | $\nu_{11} = 38.0$ |
| $r_{18} = -0.2357$ | | |
| $f_{II} = -0.284 \times f_I$, $f_{III} = 0.499 \times f_I$ | | |
| $f_{IV} = -0.714 \times f_I$, $\nu_{1T} - \nu_{1O} = 40.81$ | | |
| $\nu_{2O} - \nu_{2T} = 37.9$, $\nu_{3T} - \nu_{3O} = 39.8$ | | |
| $\nu_{4O} - \nu_{4T} = 1.4$, $n_{1O} - n_{1T} = 0.1475$ | | |
| $n_{2T} - n_{2O} = 0.22957$, $n_{3O} - n_{3T} = 0.264$ | | |
| $r_{1F}/r_{1R} = -0.554$, $r_{3F}/r_{3R} = -0.880$ | | |
| $r_{4R}/r_{4F} = 1.233$, $r_{3F}/f_{III} = 0.872$ | | |
| $n_{2O} = 1.55515$, $n_{4O} = 1.68688$ | | | where, reference symbols $r_1$ through $r_{18}$ respectively represent radii of curvature of respective lens surfaces, reference symbols $d_1$ through $d_{17}$ respectively represent thicknesses of respective lenses and airspaces between respective lenses, reference symbols $n_1$ through $n_{11}$ respectively represent refractive indices of respective lenses, and reference symbols $\nu_1$ through $\nu_{11}$ respectively represent Abbe's numbers of respective lenses.

15. An afocal zoom lens system according to claim 8 wherein said first lens group comprises a positive cemented doublet, said second lens group comprises a negative cemented doublet, which consists of a positive lens element and a negative lens element, and a negative lens component, said third lens group comprises a positive cemented doublet, which consists of a negative lens element and a positive lens element, and a positive lens component, and said fourth lens group comprises a negative lens component and a negative cemented meniscus doublet, which consists of a negative lens element and a positive lens element, said afocal zoom lens system having the following numerical data:

| | | |
|---|---|---|
| $f = 1 \sim 8.5$ | | |
| $r_1 = 0.7291$ | | |
| $d_1 = 0.041$ | $n_1 = 1.497$ | $\nu_1 = 81.61$ |
| $r_2 = -0.4838$ | | |
| $d_2 = 0.025$ | $n_2 = 1.6445$ | $\nu_2 = 40.8$ |
| $r_3 = -1.2162$ | | |
| $d_3 = 0.047 \sim 0.519$ | | |
| $r_4 = -1.9285$ | | |
| $d_4 = 0.028$ | $n_3 = 1.7552$ | $\nu_3 = 27.51$ |
| $r_5 = -0.2816$ | | |
| $d_5 = 0.019$ | $n_4 = 1.641$ | $\nu_4 = 56.93$ |
| $r_6 = 0.7541$ | | |
| $d_6 = 0.012$ | | |
| $r_7 = -0.5231$ | | |
| $d_7 = 0.019$ | $n_5 = 1.63854$ | $\nu_5 = 55.38$ |
| $r_8 = 0.7167$ | | |
| $d_8 = 1.085 \sim 0.076$ | | |
| $r_9 = 0.7201$ | | |
| $d_9 = 0.019$ | $n_6 = 1.80518$ | $\nu_6 = 25.43$ |
| $r_{10} = 0.3647$ | | |
| $d_{10} = 0.036$ | $n_7 = 1.50137$ | $\nu_7 = 56.4$ |
| $r_{11} = -0.5370$ | | |
| $d_{11} = 0.002$ | | |
| $r_{12} = 0.4519$ | | |
| $d_{12} = 0.027$ | $n_8 = 1.497$ | $\nu_8 = 81.61$ |
| $r_{13} = 0.7508$ | | |
| $d_{13} = 0.042 \sim 0.579$ | | |
| $r_{14} = 1.2694$ | | |
| $d_{14} = 0.019$ | $n_9 = 1.7552$ | $\nu_9 = 27.51$ |
| $r_{15} = 0.4692$ | | |
| $d_{15} = 0.023$ | | |
| $r_{16} = -0.2983$ | | |
| $d_{16} = 0.019$ | $n_{10} = 1.57957$ | $\nu_{10} = 53.71$ |
| $r_{17} = 0.2983$ | | |
| $d_{17} = 0.044$ | $n_{11} = 1.61659$ | $\nu_{11} = 36.63$ |
| $r_{18} = -0.3977$ | | |
| $f_{II} = -0.299 \times f_I$, $f_{III} = 0.540 \times f_I$ | | |
| $f_{IV} = -0.821 \times f_I$, $\nu_{1T} - \nu_{1O} = 40.81$ | | |
| $\nu_{2O} - \nu_{2T} = 28.65$, $\nu_{3T} - \nu_{3O} = 43.58$ | | |
| $\nu_{4O} - \nu_{4T} = 3.98$, $n_{1O} - n_{1T} = 0.1475$ | | |
| $n_{2T} - n_{2O} = 0.11543$, $n_{3O} - n_{3T} = 0.30599$ | | |
| $r_{1F}/r_{1R} = -0.05553$, $r_{3F}/r_{3R} = -2.557$ | | |
| $r_{4R}/r_{4F} = 1.333$, $r_{3F}/f_{III} = 1.2$ | | |
| $n_{2O} = 1.63977$, $n_{4O} = 1.67212$ | | | where, reference symbols $r_1$ through $r_{18}$ respectively represent radii of curvature of respective lens surfaces, reference symbols $d_1$ through $d_{17}$ respectively represent thicknesses of respective lenses and airspaces between respective lenses, reference symbols $n_1$ through $n_{11}$ respectively represent refractive indices of respective lenses, and reference symbols $\nu_1$ through $\nu_{11}$ respectively represent Abbe's numbers of respective lenses.

16. An afocal zoom lens system according to claim 8 wherein said first lens group comprises a positive cemented doublet, said second lens group comprises a negative cemented doublet, which consists of a positive lens element and a negative lens element, and a negative lens component, said third lens group comprises a positive cemented doublet, which consists of a negative lens element and a positive lens element, and a positive lens component, and said fourth lens group comprises a negative lens component and a negative cemented meniscus doublet, which consists of a negative lens element and a positive lens element, said afocal zoom lens system having the following numerical data:

| | | |
|---|---|---|
| $f = 1 \sim 8.5$ | | |
| $r_1 = 0.9057$ | | |
| $d_1 = 0.036$ | $n_1 = 1.497$ | $\nu_1 = 81.61$ |
| $r_2 = -0.4744$ | | |
| $d_2 = 0.024$ | $n_2 = 1.66755$ | $\nu_2 = 41.93$ |
| $r_3 = -1.0323$ | | |
| $d_3 = 0.038 \sim 0.571$ | | |
| $r_4 = -1.1039$ | | |
| $d_4 = 0.027$ | $n_3 = 1.69895$ | $\nu_3 = 30.12$ |
| $r_5 = -0.2230$ | | |
| $d_5 = 0.015$ | $n_4 = 1.6425$ | $\nu_4 = 58.37$ |
| $r_6 = 0.9072$ | | |
| $d_6 = 0.018$ | | |
| $r_7 = -0.6354$ | | |
| $d_7 = 0.015$ | $n_5 = 1.6425$ | $\nu_5 = 58.37$ |
| $r_8 = 1.1111$ | | |
| $d_8 = 1.1473 \sim 0.067$ | | |
| $r_9 = 0.8719$ | | |
| $d_9 = 0.022$ | $n_6 = 1.72825$ | $\nu_6 = 28.46$ |
| $r_{10} = 0.4221$ | | |
| $d_{10} = 0.036$ | $n_7 = 1.497$ | $\nu_7 = 81.61$ |
| $r_{11} = -0.6249$ | | |
| $d_{11} = 0.003$ | | |
| $r_{12} = 0.7691$ | | |
| $d_{12} = 0.032$ | $n_8 = 1.497$ | $\nu_8 = 81.61$ |
| $r_{13} = 3.3266$ | | |
| $d_{13} = 0.035 \sim 0.582$ | | |
| $r_{14} = 2.2185$ | | |
| $d_{14} = 0.020$ | $n_9 = 1.74$ | $\nu_9 = 31.7$ |
| $r_{15} = 0.7277$ | | |
| $d_{15} = 0.028$ | | |
| $r_{16} = -0.3759$ | | |
| $d_{16} = 0.020$ | $n_{10} = 1.50847$ | $\nu_{10} = 60.83$ |
| $r_{17} = 0.3198$ | | |
| $d_{17} = 0.038$ | $n_{11} = 1.5927$ | $\nu_{11} = 35.29$ |
| $r_{18} = -0.8989$ | | |
| $f_{II} = -0.302 \times f_I$, $f_{III} = 0.53 \times f_I$ | | |

-continued

```
f_IV = -0.782 × f_I, ν_1T - ν_1O = 39.68
ν_2O - ν_2T = 28.25, ν_3T - ν_3O = 53.15
ν_4O - ν_4T = 11.01, n_1O - n_1T = 0.17055
n_2T - n_2O = 0.05645, n_3O - n_3T = 0.23125
r_1F/r_1R = -0.877, r_3F/r_3R = -1.395
r_4R/r_4F = 2.392, r_3F/f_III = 1.366
n_2O = 1.6425, n_4O = 1.62424
``` where, reference symbols $r_1$ through $r_{18}$ respectively represent radii of curvature of respective lens surfaces, reference symbols $d_1$ through $d_{17}$ respectively represent thicknesses of respective lenses and airspaces between respective lenses, reference symbols $n_1$ through $n_{11}$ respectively represent refractive indices of respective lenses, and reference symbols $\nu_1$ through $\nu_{11}$ respectively represent Abbe's numbers of respective lenses.

17. An afocal zoom lens system according to claim 8 wherein said first lens group comprises a positive cemented doublet, said second lens group comprises a negative cemented doublet, which consists of a positive lens element and a negative lens element, and a negative lens component, said third lens group comprises a positive cemented doublet, which consists of a negative lens element and a positive lens element, and a positive lens component, and said fourth lens group comprises a negative lens component and a negative cemented meniscus doublet, which consists of a negative lens element and a positive lens element, said afocal zoom lens system having the following numerical data:

```
f = 1~8.5
r_1 = 0.6822
d_1 = 0.038          n_1 = 1.497      ν_1 = 81.61
r_2 = -0.5269
d_2 = 0.024          n_2 = 1.6445     ν_2 = 40.8
r_3 = -1.4201
d_3 = 0.027~0.517
r_4 = -1.4065
d_4 = 0.025          n_3 = 1.7552     ν_3 = 27.51
r_5 = -0.2768
d_5 = 0.019          n_4 = 1.641      ν_4 = 56.93
r_6 = 0.9065
d_6 = 0.017
r_7 = -0.5489
d_7 = 0.019          n_5 = 1.63854    ν_5 = 55.38
r_8 = 0.7053
d_8 = 1.088~0.078
r_9 = 0.5977
d_9 = 0.019          n_6 = 1.78472    ν_6 = 25.68
r_10 = 0.3187
d_10 = 0.036         n_7 = 1.50137    ν_7 = 56.4
r_11 = -0.5445
d_11 = 0.002
r_12 = 0.5060
d_12 = 0.026         n_8 = 1.497      ν_8 = 81.61
r_13 = 0.7310
d_13 = 0.050~0.570
r_14 = 1.0314
d_14 = 0.019         n_9 = 1.7552     ν_9 = 27.51
r_15 = 0.4415
d_15 = 0.032
r_16 = -0.2832
d_16 = 0.019         n_10 = 1.57135   ν_10 = 52.92
r_17 = 0.2819
d_17 = 0.041         n_11 = 1.61659   ν_11 = 36.63
r_18 = -0.3990
f_II = -0.301 × f_I, f_III = 0.541 × f_I
f_IV = -0.809 × f_I, ν_1T - ν_1O = 40.81
ν_2O - ν_2T = 28.65, ν_3T - ν_3O = 43.33
ν_4O - ν_4T = 3.57, n_1O - n_1T = 0.1475
n_2T - n_2O = 0.11543, n_3O - n_3T = 0.28553
r_1F/r_1R = -0.480, r_3F/r_3R = -1.098
r_4R/r_4F = 1.409, r_3F/f_III = 0.99
```

-continued

```
n_2O = 1.63977, n_4O = 1.66328
``` where, reference symbols $r_1$ through $r_{18}$ respectively represent radii of curvature of respective lens surfaces, reference symbols $d_1$ through $d_{17}$ respectively represent thicknesses of respective lenses and airspaces between respective lenses, reference symbols $n_1$ through $n_{11}$ respectively represent refractive indices of respective lenses, and reference symbols $\nu_1$ through $\nu_{11}$ respectively represent Abbe's numbers of respective lenses.

18. An afocal zoom lens system according to claim 8 wherein said first lens group comprises a positive cemented doublet, said second lens group comprises a negative cemented doublet, which consists of a positive lens element and a negative lens element, and a negative lens component, said third lens group comprises a positive cemented doublet, which consists of a negative lens element and a positive lens element, and a positive lens component, and said fourth lens group comprises a negative lens component and a negative cemented meniscus doublet, which consists of a negative lens element and a positive lens element, said afocal zoom lens system having the following numerical data:

```
f = 1~8.5
r_1 = 0.7258
d_1 = 0.041          n_1 = 1.51728    ν_1 = 69.56
r_2 = -0.5836
d_2 = 0.024          n_2 = 1.85026    ν_2 = 32.28
r_3 = -1.1102
d_3 = 0.051~0.582
r_4 = -1.9238
d_4 = 0.028          n_3 = 1.7552     ν_3 = 27.51
r_5 = -0.2808
d_5 = 0.019          n_4 = 1.641      ν_4 = 56.93
r_6 = 0.7522
d_6 = 0.012
r_7 = -0.5216
d_7 = 0.019          n_5 = 1.63854    ν_5 = 55.38
r_8 = 0.7149
d_8 = 1.112~0.107
r_9 = 0.7167
d_9 = 0.019          n_6 = 1.80518    ν_6 = 25.43
r_10 = 0.3638
d_10 = 0.036         n_7 = 1.50137    ν_7 = 56.4
r_11 = -0.5358
d_11 = 0.002
r_12 = 0.4508
d_12 = 0.026         n_8 = 1.497      ν_8 = 81.61
r_13 = 0.7465
d_13 = 0.043~0.578
r_14 = 1.2661
d_14 = 0.019         n_9 = 1.7552     ν_9 = 27.51
r_15 = 0.4683
d_15 = 0.023
r_16 = -0.2974
d_16 = 0.019         n_10 = 1.57957   ν_10 = 53.71
r_17 = 0.2974
d_17 = 0.044         n_11 = 1.61659   ν_11 = 36.63
r_18 = -0.3968
f_II = -0.299 × f_I, f_III = 0.54 × f_I
f_IV = -0.821 × f_I, ν_1T - ν_1O = 37.28
ν_2O - ν_2T = 28.65, ν_3T - ν_3O = 43.58
ν_4O - ν_4T = 3.97, n_1O - n_1T = 0.33298
n_2T - n_2O = 0.11543, n_3O - n_3T = 0.30599
r_1F/r_1R = -0.654, r_3F/r_3R = -1.338
r_4R/r_4F = 1.334, r_3F/f_III = 1.197
n_2O = 1.63977, n_4O = 1.66739
``` where, reference symbols $r_1$ through $r_{18}$ respectively represent radii of curvature of respective lens surfaces, reference symbols $d_1$ through $d_{17}$ respectively represent thicknesses of respective lenses and airspaces between respective lenses, reference symbols $n_1$ through $n_{11}$ respectively represent refractive indices of respective lenses, and reference symbols $\nu_1$ through $\nu_{11}$ resepctively represent Abbe's numbers of respective lenses.

19. An afocal zoom lens system according to claim 8 wherein said first lens group comprises a positive cemented doublet, said second lens group comprises a negative cemented doublet, which consists of a positive lens element and a negative lens element, and a negative lens component, said third lens group comprises a positive cemented doublet, which consists of a negative lens element and a positive lens element, and a positive lens component, and said fourth lens group comprises a negative lens component and a negative cemented meniscus doublet, which consists of a negative lens element and a positive lens element, said afocal zoom lens system having the following numerical data:

| | | |
|---|---|---|
| $f = 1 \sim 8.5$ | | |
| $r_1 = 0.6603$ | | |
| $d_1 = 0.041$ | $n_1 = 1.50137$ | $\nu_1 = 56.4$ |
| $r_2 = -0.5920$ | | |
| $d_2 = 0.024$ | $n_2 = 1.76182$ | $\nu_2 = 26.52$ |
| $r_3 = -1.2931$ | | |
| $d_3 = 0.035 \sim 0.505$ | | |
| $r_4 = 9.7907$ | | |
| $d_4 = 0.033$ | $n_3 = 1.78472$ | $\nu_3 = 25.71$ |
| $r_5 = -0.2700$ | | |
| $d_5 = 0.019$ | $n_4 = 1.6425$ | $\nu_4 = 58.37$ |
| $r_6 = 0.6562$ | | |
| $d_6 = 0.012$ | | |
| $r_7 = -0.4096$ | | |
| $d_7 = 0.019$ | $n_5 = 1.63636$ | $\nu_5 = 35.37$ |
| $r_8 = 0.5871$ | | |
| $d_8 = 1.080 \sim 0.076$ | | |
| $r_9 = 0.9454$ | | |
| $d_9 = 0.019$ | $n_6 = 1.80518$ | $\nu_6 = 25.43$ |
| $r_{10} = 0.3961$ | | |
| $d_{10} = 0.040$ | $n_7 = 1.50137$ | $\nu_7 = 56.4$ |
| $r_{11} = -0.4613$ | | |
| $d_{11} = 0.002$ | | |
| $r_{12} = 0.4050$ | | |
| $d_{12} = 0.022$ | $n_8 = 1.497$ | $\nu_8 = 81.61$ |
| $r_{13} = 0.6706$ | | |
| $d_{13} = 0.029 \sim 0.563$ | | |
| $r_{14} = 0.8435$ | | |
| $d_{14} = 0.019$ | $n_9 = 1.74$ | $\nu_9 = 28.29$ |
| $r_{15} = 0.4287$ | | |
| $d_{15} = 0.019$ | | |
| $r_{16} = -0.3421$ | | |
| $d_{16} = 0.019$ | $n_{10} = 1.55671$ | $\nu_{10} = 58.68$ |
| $r_{17} = 0.3206$ | | |
| $d_{17} = 0.044$ | $n_{11} = 1.62004$ | $\nu_{11} = 36.25$ |
| $r_{18} = -0.5842$ | | |
| $f_{II} = -0.299 \times f_I$, $f_{III} = 0.540 \times f_I$ | | |
| $f_{IV} = -0.821 \times f_I$, $\nu_{1T} - \nu_{1O} = 29.88$ | | |
| $\nu_{2O} - \nu_{2T} = 21.16$, $\nu_{3T} - \nu_{3O} = 43.58$ | | |
| $\nu_{4O} - \nu_{4T} = 7.24$, $n_{1O} - n_{1T} = 0.26045$ | | |
| $n_{2T} - n_{2O} = 0.14529$, $n_{3O} - n_{3T} = 0.30600$ | | |
| $r_{1F}/r_{1R} = -0.511$, $r_{3F}/r_{3R} = -2.049$ | | |
| $r_{4R}/r_{4F} = 1.708$, $r_{3F}/f_{III} = -1.580$ | | |
| $n_{2O} = 1.63943$, $n_{4O} = 1.64836$ | | | where, reference symbols $r_1$ through $r_{18}$ respectively represent radii of curvature of respective lens surfaces, reference symbols $d_1$ through $d_{17}$ respectively represent thicknesses of respective lenses and airspaces between respective lenses, reference symbols $n_1$ through $n_{11}$ respectively represent refractive indices of respective lenses, and reference symbols $\nu_1$ through $\nu_{11}$ respectively represent Abbe's numbers of respective lenses.

* * * * *